United States Patent
Weissenborn

(10) Patent No.: US 10,773,150 B2
(45) Date of Patent: Sep. 15, 2020

(54) APPARATUS FOR TUNING SKI AND SNOWBOARD EDGES

(71) Applicant: Richard Weissenborn, Calgary (CA)

(72) Inventor: Richard Weissenborn, Calgary (CA)

(*) Notice: Subject to any disclaimer, the term of this patent is extended or adjusted under 35 U.S.C. 154(b) by 340 days.

(21) Appl. No.: 15/677,541

(22) Filed: Aug. 15, 2017

(65) Prior Publication Data

US 2019/0054365 A1    Feb. 21, 2019

(51) Int. Cl.
*A63C 11/06*    (2006.01)
*B23D 69/02*    (2006.01)
*B24D 15/06*    (2006.01)

(52) U.S. Cl.
CPC .............. *A63C 11/06* (2013.01); *B23D 69/02* (2013.01); *B24D 15/068* (2013.01)

(58) Field of Classification Search
CPC .... A63C 11/06; B24D 15/066; B24D 15/068; B23D 69/02
USPC ...... 451/438, 545, 549, 555, 558; 76/83, 88, 76/89
See application file for complete search history.

(56) References Cited

U.S. PATENT DOCUMENTS

| | | | | |
|---|---|---|---|---|
| 3,339,433 A * | 9/1967 | Sonn | .................... | A63C 11/06 76/82 |
| 3,766,649 A * | 10/1973 | Winbauer | .............. | A63C 11/06 30/287 |
| 3,875,825 A * | 4/1975 | Buttafuoco | ............ | A63C 11/06 76/83 |
| 3,934,287 A * | 1/1976 | Howard | .................. | A63C 11/08 7/158 |
| 3,968,345 A * | 7/1976 | Kollmeder | ............. | A63C 11/06 219/228 |
| 4,060,013 A * | 11/1977 | Thompson | ............. | A63C 11/06 76/83 |
| 4,089,076 A * | 5/1978 | Sparling | ................ | A63C 11/06 280/809 |
| 4,241,624 A * | 12/1980 | Strojny | .................. | A63C 11/06 280/809 |
| 4,569,158 A * | 2/1986 | Curmi | .................... | B23D 67/12 30/287 |
| 4,630,409 A * | 12/1986 | Hofstetter | .............. | A63C 11/04 407/29.15 |
| 4,665,778 A * | 5/1987 | Lubin | .................... | A63C 11/06 407/29.15 |
| 4,721,020 A * | 1/1988 | Stumpf | .................. | A63C 11/06 451/558 |
| 5,499,555 A * | 3/1996 | Vermillion | ............. | A63C 11/06 76/83 |
| 5,569,064 A * | 10/1996 | Gleadall | .............. | B24D 15/066 451/558 |
| 5,643,066 A * | 7/1997 | Vermillion | ............. | A63C 11/06 451/442 |

(Continued)

*Primary Examiner* — Eileen P Morgan
(74) *Attorney, Agent, or Firm* — Robert Nakano

(57) ABSTRACT

An apparatus for sharpening and/or beveling of either a ski or snowboard side edge or base edge is provided. It comprises a tool support bar, a wear plate, a shim and an indexing pad that are adapted to be handheld by a technician using the apparatus. Each bar includes two tool support surfaces and may be detached and reattached to the wear plate. The shim and indexing pad are also attachable to the apparatus at a plurality of locations that provide multiple angular orientations for a sharpening tool used with the apparatus.

22 Claims, 14 Drawing Sheets

(56) References Cited

U.S. PATENT DOCUMENTS

| | | | | |
|---|---|---|---|---|
| 5,647,250 | A | * | 7/1997 | Holmer ............... A63C 11/06 451/349 |
| 5,989,115 | A | * | 11/1999 | Hodge ................. A63C 3/10 451/523 |
| 6,260,441 | B1 | * | 7/2001 | Landl ................. A63C 11/06 451/558 |
| 6,386,068 | B1 | * | 5/2002 | Weissenborn ......... A63C 11/06 76/83 |
| 6,405,615 | B1 | * | 6/2002 | Vermillion ........... A63C 11/04 407/29.15 |
| 6,702,656 | B1 | * | 3/2004 | Hibbert .............. A63C 11/06 451/120 |
| 2002/0035894 | A1 | * | 3/2002 | Weissenborn ......... A63C 11/06 76/83 |

* cited by examiner

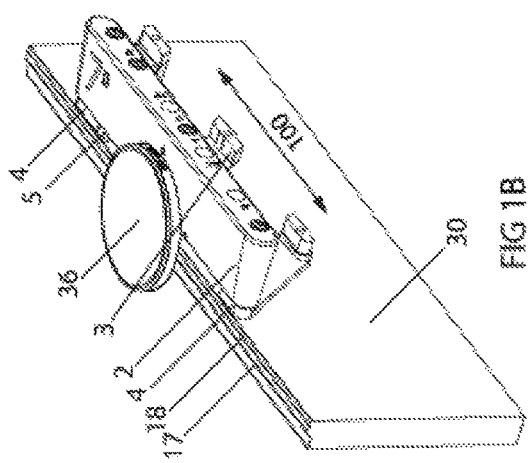
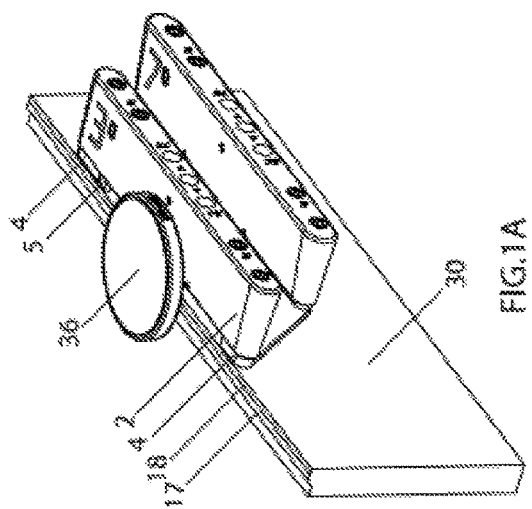
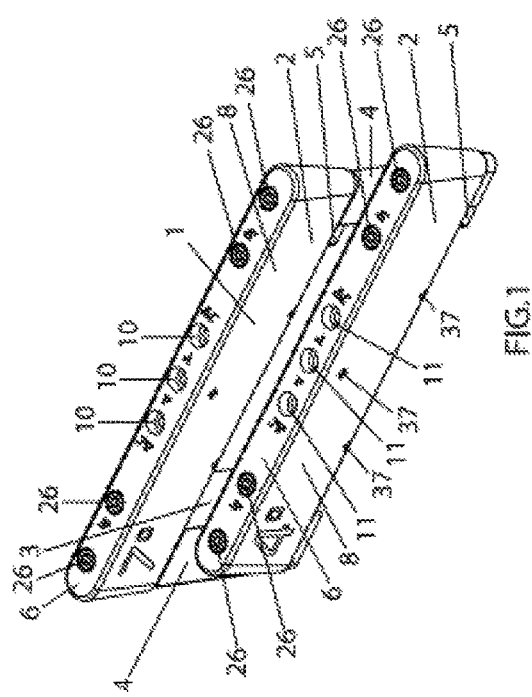
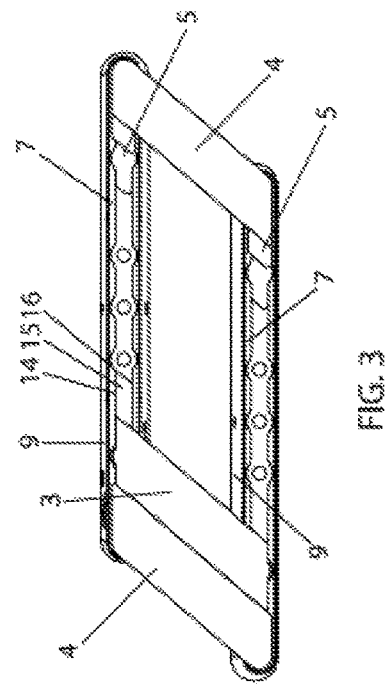
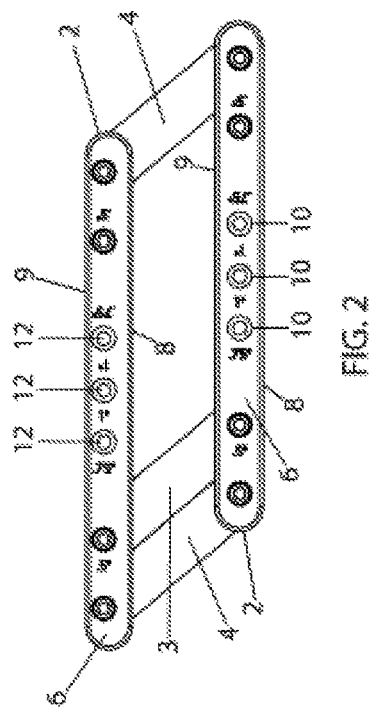

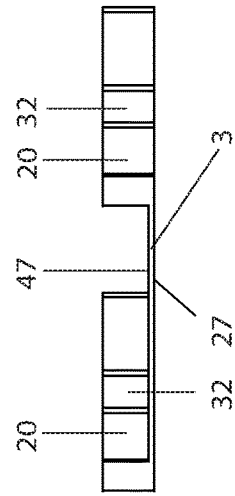
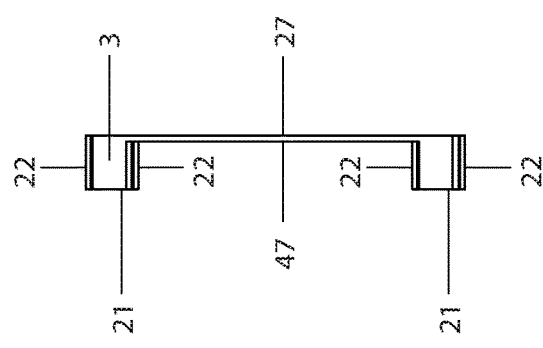
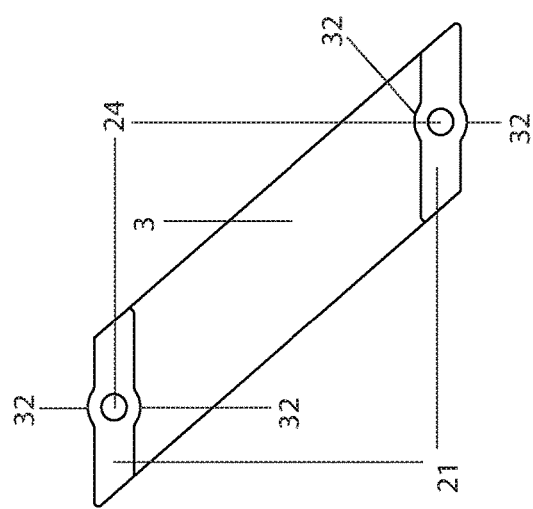
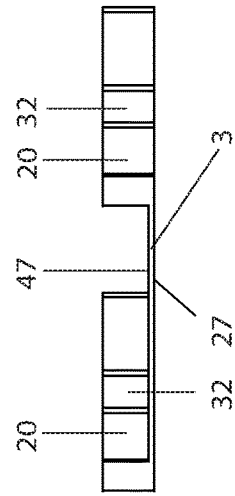
FIG. 12A
FIG. 12C
FIG. 12
FIG. 12B

FIG. 13
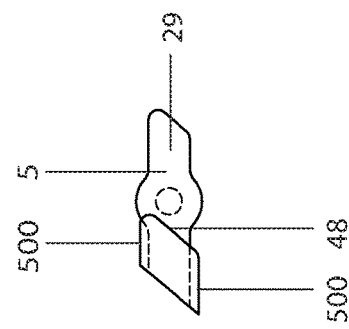
FIG. 13A
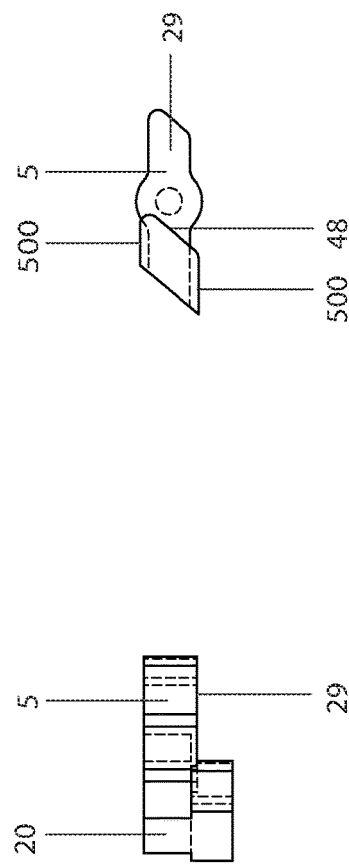
FIG. 13B
FIG. 13C

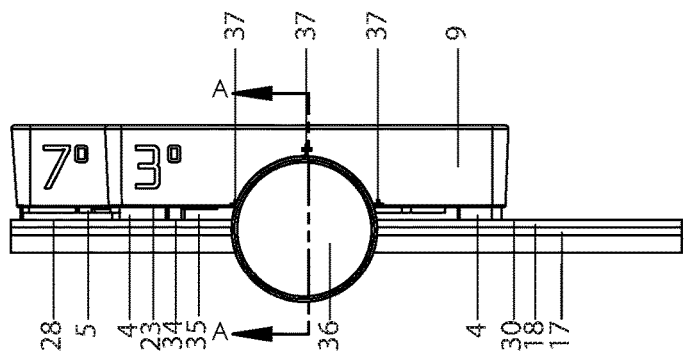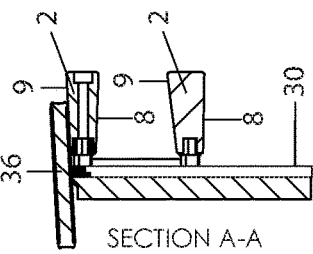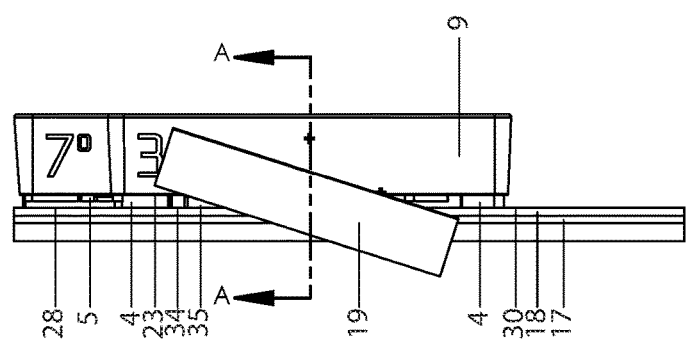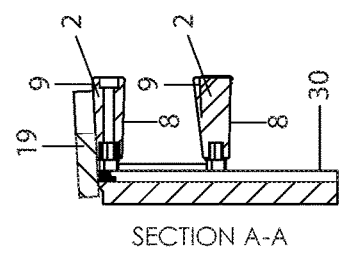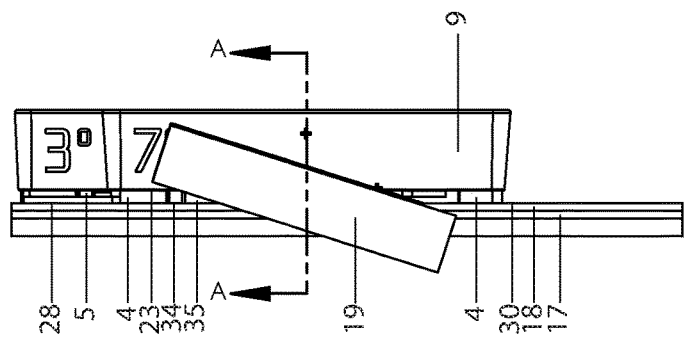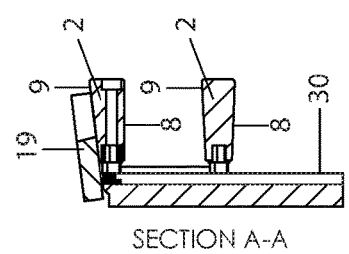

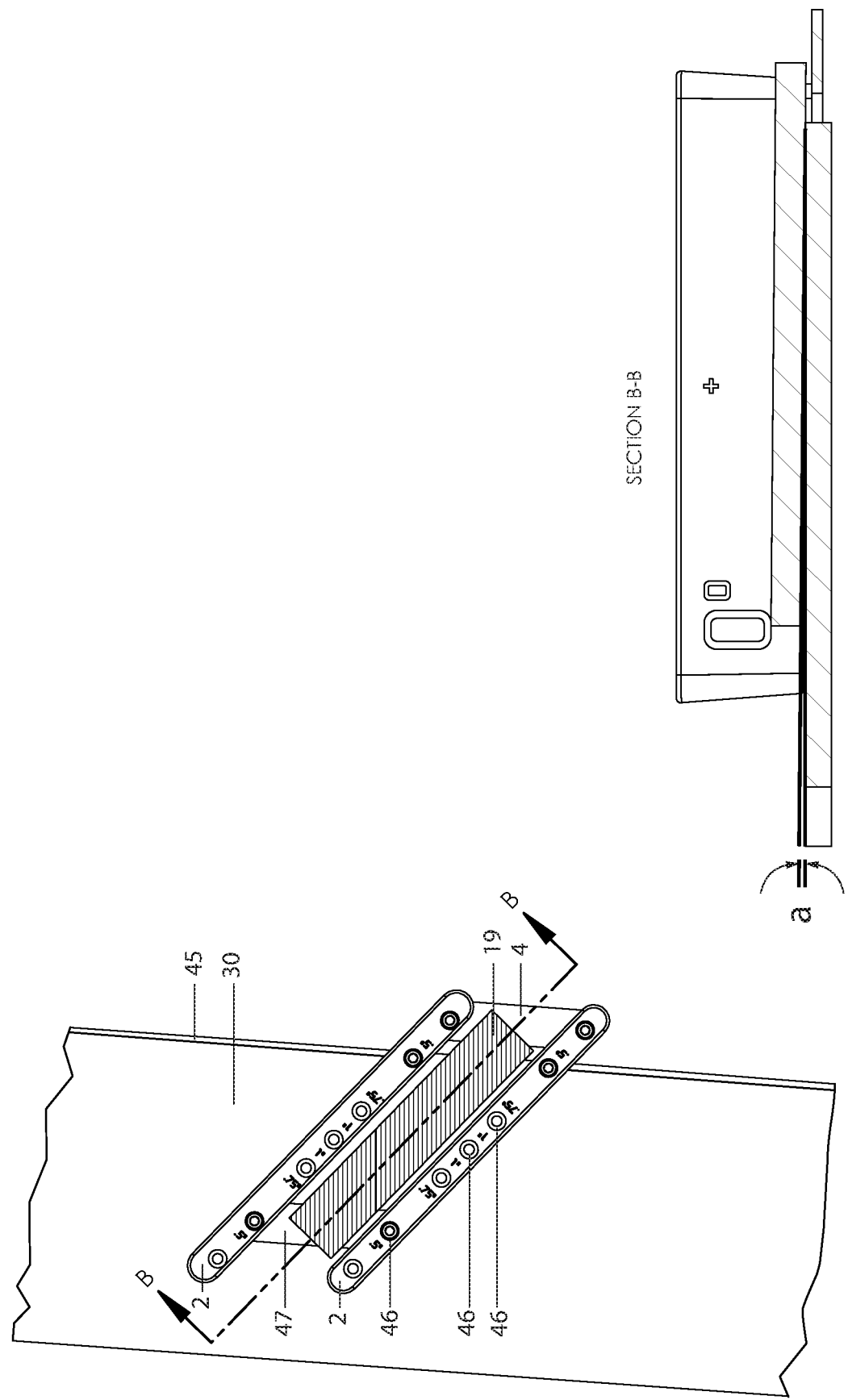

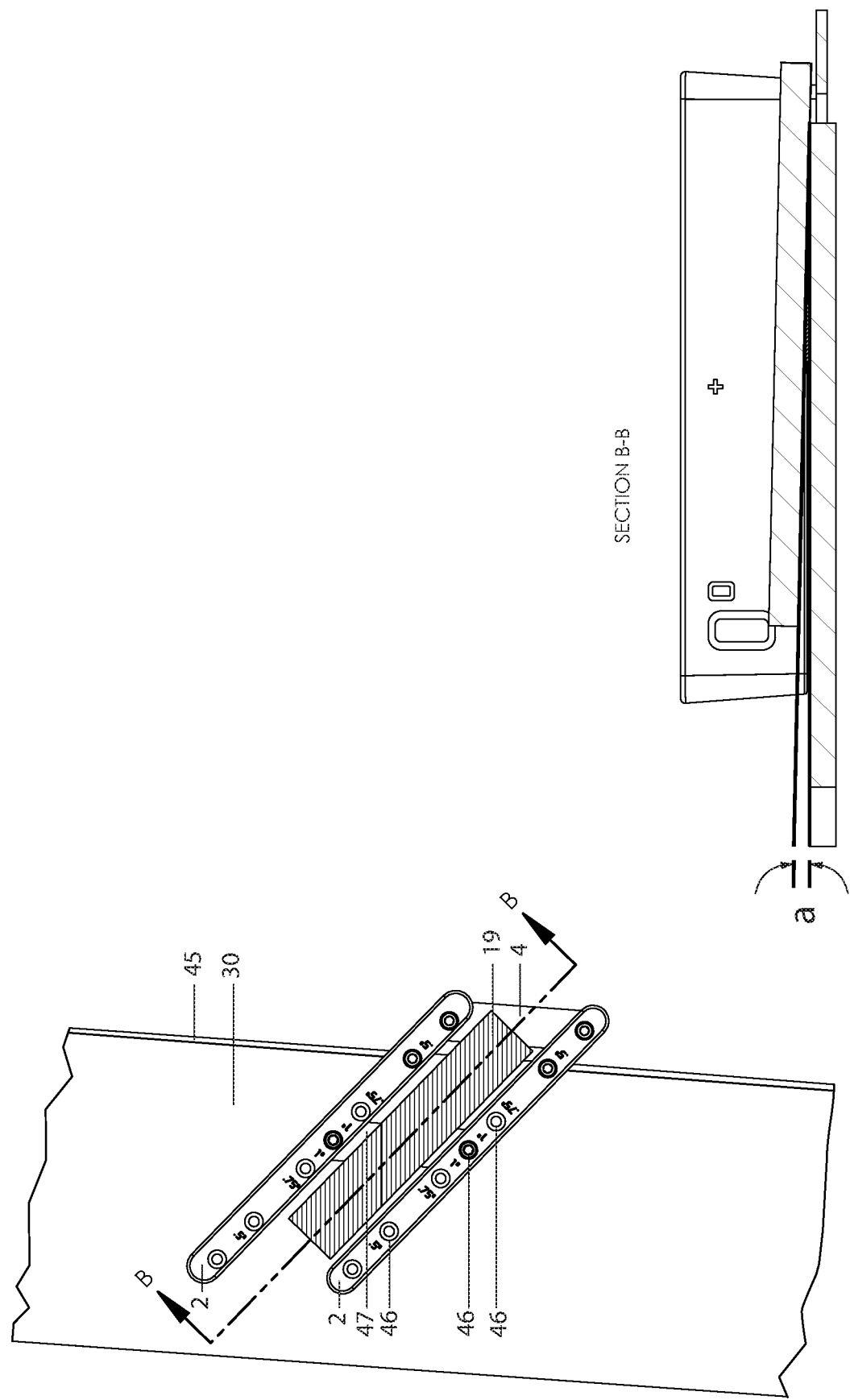

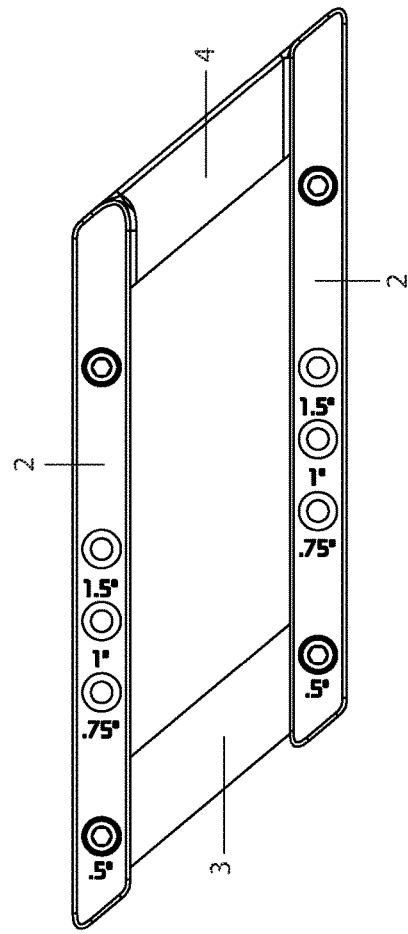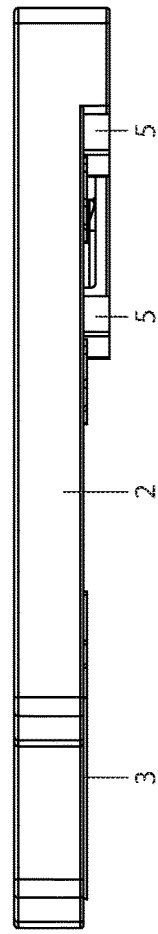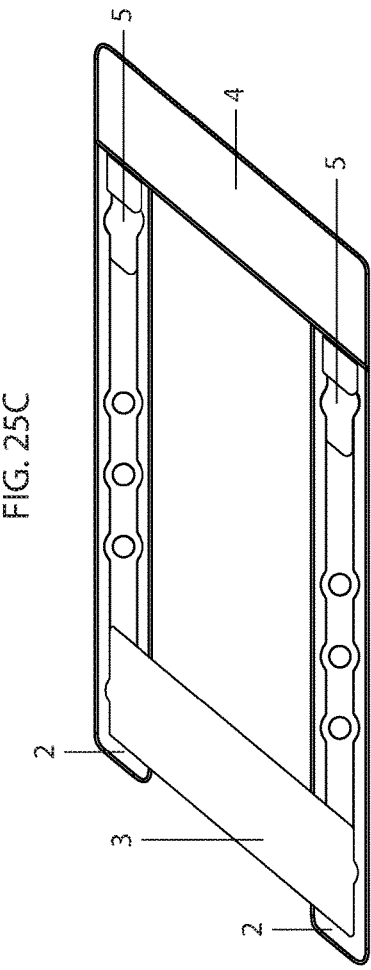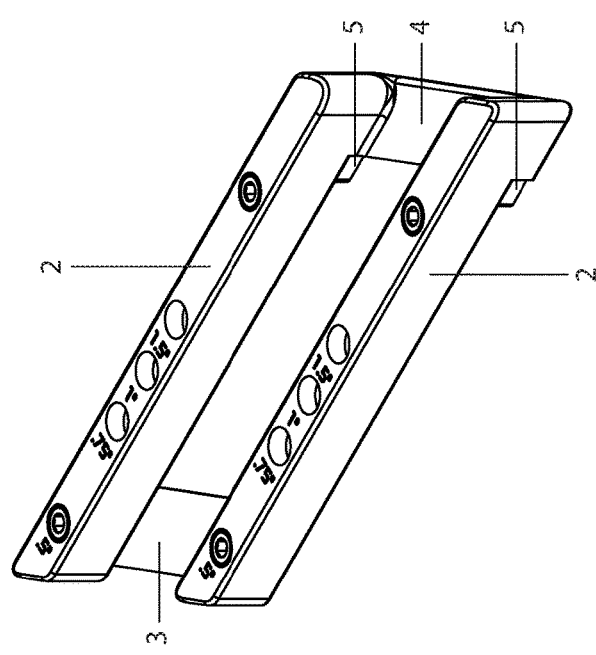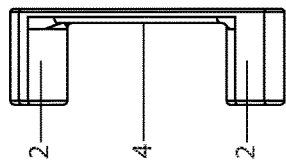

APPARATUS FOR TUNING SKI AND SNOWBOARD EDGES

FIELD OF DISCLOSURE

The present disclosure relates to an apparatus for tuning an edge of snow sports equipment, such as a side or base edge of a ski or snowboard.

BACKGROUND

Prior art edge sharpening apparatus for skis and snowboards typically include a guide adapted to be handheld by a technician and moved lengthwise along an edge portion of a ski or snowboard while in contact with the surface thereof. Such apparatus may also include a clamping mechanism for clamping a file or the like (e.g. commercially available cutting and polishing implements such as mill files, diamond stones etc.) in or to the guide.

Past ski and snowboard designs incorporated metal edges with conventional 90° (degree) edge geometry (ski or snowboard base edge and base create a flat running surface with the side edge perpendicular to the base edge). More recent ski and snowboard designs have changed dramatically as a result of technological advances in materials and construction. These more-recent ski and snowboard have side cuts and cambers that are more pronounced than earlier designs. While the base of the current designs has remained relatively flat, current skis and snowboards are manufactured having inherent base edge and side edge bevel angles. As a result, prior art sharpening apparatus have issues in maintaining at least one or both of base edge and side edge bevel angles when sharpening (and polishing) a ski or snowboard, which is a characteristic of optimal ski and snowboard performance.

SUMMARY OF THE DISCLOSURE

In a first aspect, an apparatus for supporting a sharpening tool when tuning an edge of a ski or snowboard is provided. The apparatus comprises: a first tool support bar having a top surface, a bottom surface and a first tool support surface connecting the top surface to the bottom surface, the first tool support surface providing a surface for placing the sharpening tool when tuning the edge; and a wear plate detachably matable to the bottom surface of the first tool support bar.

In the apparatus, the first tool support bar may further comprise a second tool support surface connecting the top surface to the bottom surface in a space relationship to the first tool support surface, the second tool support surface providing a second surface for placing the sharpening tool when sharpening the edge. The first tool support bar may be matable to the wear plate in a first and a second position, where in the first position the first tool support surface is presented to an exterior side of the apparatus to provide support for the sharpening tool while the apparatus is in use with the wear plate being held against a base of the ski or snowboard and where in the second position the second tool support surface is presented to the exterior side of the apparatus to provide support for the sharpening tool.

In the apparatus, wherein the first and second tool support surfaces may be symmetric to each other about a longitudinal axis of the first tool support bar. Also, the first and second tool support surfaces may be parallel to each other.

In the apparatus, the first and second tool support surfaces may taper towards each other from the top surface to the bottom surface.

In the apparatus, the wear plate may further comprise an open area to collect filings from the ski or snowboard created when tuning the edge of the ski or snowboard.

In the apparatus, the first tool bar may further comprise a screw port to receive a screw to mate the first tool bar to the wear plate.

The apparatus may further comprise a second tool support bar having a top surface, a bottom surface and a tool support surface connecting the top surface to the bottom surface, where the tool support surface provides a third surface for placing the sharpening tool, and where the second tool support bar may be detachably matable to the wear plate at a spaced relationship from the first tool support bar.

In the apparatus, the second tool support bar may further comprise a fourth tool support surface connecting the top surface to the bottom surface in a space relationship to the third tool support surface, the fourth tool support surface providing a fourth surface for placing the sharpening tool when sharpening the edge. The second tool support bar may be matable to the wear plate in a first and a second position, where in the first position the third tool support surface is presented to an exterior side of the apparatus to provide support for the sharpening tool while the apparatus is in use with the wear plate being held against a base of the ski or snowboard and where in the second position the fourth tool support surface is presented to the exterior side of the apparatus to provide support for the sharpening tool.

In the apparatus, wherein the first and second tool support surfaces may be symmetric to each other about a longitudinal axis of the first tool support bar. Also, the first and second tool support surfaces may be parallel to each other.

In the apparatus, the third and fourth tool support surfaces may be symmetric to each other about a longitudinal axis of the second tool support bar. Also, the third and fourth tool support surfaces may be parallel to each other.

In the apparatus, the first and second tool support surfaces may taper towards each other from the top surface to the bottom surface.

In the apparatus, the third and fourth tool support surfaces may taper towards each other from the top surface to the bottom surface In the apparatus, each of the first and second tool support bars may be rotated approximately 180° about their longitudinal axis.

In the apparatus, the first and second bars may be mountable to the wear plate in a plurality of complementary positions at one of a plurality of angular orientations to orient the sharpening tool at a plurality of edge angles to the edge when the apparatus is positioned at a side edge portion of the ski or snowboard.

The apparatus may further comprise: a shim attachable to at least one of the first and second tool support bars; and an indexing pad attachable to at least one of the first and second tool support bars. Here, the edge may be a base edge of the ski or snowboard and the positions of the shim and the indexing pad relative to their attached tool support bar may orient the sharpening tool at a set elevation and angle relative to the base edge when the sharpening tool is placed upon a top surface of shim and base edge.

In the apparatus, the shim, wear plate and indexing pad may be positioned in parallel proximity to the edge of the ski or snowboard edge; and the first and second tool support bars may be positioned at approximately a 40° angle in a plane transverse to the lengthwise direction when the apparatus is positioned and moved lengthwise along a base edge portion of the ski or snowboard while in contact with the surface thereof.

In the apparatus, at least one of the first and second tool support bars may further comprise one or more cavities for receiving the wear plate, shim and indexing pad.

In the apparatus, at least one of the first and second tool support bars may further comprise an area to collect filings from the ski or snowboard created when tuning the edge of the ski or snowboard.

In the apparatus, a horizontal offset may be created among the base top and bottom surfaces of the wear plate and indexing pad providing an aperture through which edge filings and debris may fall between first and second tool support bars and the base of the ski or snowboard.

In the apparatus, the wear plate may further comprise a support tongue to facilitate mounting of the wear plate to tool support bar in a generally vertical orientation.

The apparatus may further comprise a second wear plate detachably matable to the bottom surfaces of the first and second tool support bars.

The apparatus may further comprise: an abrasive disc having a first abrasive surface; and a position indicator on the first tool support, the position indicator providing an alignment indicator for a shape of the abrasive disc marking a contact area for the first abrasive surface on an edge of the ski or snowboard.

In the apparatus, the abrasive disc may have a second abrasive surface; and a position indicator on the second tool support, the position indicator providing an alignment indicator for a shape of the abrasive disc marking a contact area for the first abrasive surface on an edge of the ski or snowboard.

In the apparatus, the shape of the abrasive disc may be circular; and the position indicator indicates that approximately half of the abrasive disc will contact the contact area.

In another aspect, an apparatus for sharpening and/or beveling of a ski or snowboard side wall and/or side edge including a guide for placing a sharpening tool thereon is provided. The apparatus comprises at least one tool support bar and one wear plate, where each tool support bar includes an external top surface, external bottom surface and two elongated surfaces upon which a file may be placed to establish angular orientations of the guide relative to the side wall and side edge, and where the elongated surfaces of each tool support bar are generally parallel to each other or tapered from external top surface to external bottom surface.

In the apparatus, each tool support bar may be symmetric about its longitudinal axis and may be detached, rotated about its longitudinal axis and re-attached to the wear plate.

In the apparatus, each tool support bar may have at least one elongated cavity for receiving the wear plate and may provide an area into which edge filings and debris may fall and be collected when the apparatus is moved lengthwise along the side edge portion of the ski or snowboard while in contact with a surface thereof.

In the apparatus, each wear plate may include at least one support tongue to facilitate mounting of the wear plate to the tool support bar in a generally vertical orientation.

In the apparatus, the tool support bar may have at least one screw port to facilitate fastening the wear plate by means of screws or other similar fasteners.

In the apparatus, the wear plate may include an open area in approximately its middle section along at least one edge into which edge filings and debris may fall to prevent the filings and debris from falling, becoming lodged between, and/or scratching the wear plate and/or the ski or snowboard base when apparatus is moved lengthwise along the side wall and/or side edge portion of the ski or snowboard while in contact with a surface thereof.

The apparatus may further comprise a second tool support bar that may be detachably mounted to the wear plate creating angular orientations of the apparatus and the sharpening tool in a plane transverse to said lengthwise direction when the apparatus is positioned at the side edge portion of the ski or snowboard, thereby establishing a desired side wall and/or side edge geometry or bevel angle.

In another aspect, an apparatus for the sharpening and/or beveling of either a ski or snowboard side edge or base edge is provided. The apparatus comprising a tool support bar, a wear plate, a shim, and an indexing pad. The tool support bar has an external top surface, external bottom surface and two elongated surfaces upon which a sharpening tool may be placed to establish angular orientations of the apparatus relative to a ski and snowboard side wall and side edge. The elongated surfaces of the tool support bar are generally parallel to each other or tapered from external top surface to external bottom surface.

In the apparatus, the tool support bar may be symmetric about its longitudinal axis and may be detached, rotated approximately 180° about its longitudinal axis and re-attached to the wear plate, shim, and indexing pad to establish multiple selected angular orientations of the apparatus and the sharpening tool in a plane transverse to the lengthwise direction when positioned at the side wall and/or side edge portion of the ski or snowboard while in contact with the surface thereof.

In the apparatus, the tool support bar may include a cavity for receiving one of the wear plate, shim, and indexing pad.

In the apparatus, the tool support bar may provide an area into which edge filings and debris may fall and be collected when the apparatus is moved lengthwise along the side edge portion of the ski or snowboard while in contact with a surface thereof.

In the apparatus, the wear plate, shim, and indexing pad may each include at least one support tongue to facilitate mounting of the wear plate to the tool support bar in a generally vertical orientation.

In the apparatus, the tool support bar may include a screw port to facilitate fastening the wear plate, shim, and indexing pad by means of screws or other similar fasteners.

In the apparatus, a horizontal offset is provided between the base top surfaces of the wear plate and indexing pad and the bottom surfaces of the wear plate and the indexing pad to provide an aperture through which edge filings and debris may fall between tool support bars and the surfaces of the wear plate.

The apparatus may further comprise: an abrasive disc with an abrasive surface of varying grits on one or both sides and a circumference corresponding to; and disc position indicator(s) on a surface of tool support bar(s) to indicate an alignment of the disc with when placed on the surface of the tool support bar.

In the apparatus, the indicators may be positioned on the surface of the tool support bar such that when the circumference of disc is aligned with indicators, potentially up to the full diameter of the disc is in contact with the surface of a ski or snowboard side edge to maximize the edge cutting and polishing efficiency of the disc.

In another aspect, an apparatus for the sharpening and/or beveling of a ski or snowboard base edge is provided, which assists in providing a support to orient a sharpening tool when the apparatus and the sharpening tool are being used so that the base edge may be beveled at a plurality of angles.

The apparatus comprises two tool support bars, a wear plate, a shim, and two indexing pads attached to the bars. The shim may be fastened to the bars in spaced apart proximity to the indexing pads at one of a plurality of fixed positions allowing both the elevation and angle of sharpening tool to be adjusted relative to the base edge of a ski or snowboard when the sharpening tool is placed upon the top surface of shim and base edge.

In the apparatus, at least one bar and wear plate may be an integral unit to which the shim and at least one indexing pad may be fastened, and where shim may be fastened in spaced apart proximity to the at least one indexing pad at one of a plurality of fixed positions allowing both elevation and angle of the sharpening tool to be adjusted relative to the base edge of the ski or snowboard when the sharpening tool is placed upon the top surface of shim and base edge.

In the apparatus, the indexing pads may be removable and interchangeable.

In the apparatus, the wear plate and indexing pad may be an integral unit fastened to one bar and shim may be fastened in spaced apart proximity to the integral unit at one of a plurality of fixed positions allowing both elevation and angle of the sharpening tool to be adjusted relative to the base edge of the ski or snowboard when the sharpening tool is placed upon the top surface of shim and base edge.

In the apparatus, the shim, wear plate and indexing pad may be positioned in parallel proximity to the base edge of the ski or snowboard and the tool support bars may be positioned at approximately a 40° angle in a plane transverse to the lengthwise direction when the apparatus is positioned and moved lengthwise along the base edge portion of the ski or snowboard while in contact with the surface thereof.

In another aspect, an apparatus for sharpening and/or beveling of a ski or snowboard side edge or base edge is provided. The apparatus has a guide for placing a file or stone thereon, and comprises at least one tool support bar, wear plate, shim and indexing pad and is adapted to be handheld and moved lengthwise along an edge portion of the ski or snowboard while in contact with the surface thereof.

According to another aspect, each bar includes two elongate surfaces and is able to be detached, rotated 180° about its longitudinal axis and re-attached to the wear plates, shim and indexing pads in order to establish multiple selected angular orientations of the guide and the file or stone in a plane transverse to the lengthwise direction when positioned at the side edge portion of the ski or snowboard while in contact with the surface thereof. Alternatively a ski or snowboard base edge may be beveled at a plurality of angles when one wear plate is removed and the shim is fastened to the bars in spaced proximity to the indexing pads at one of multiple predetermined fixed positions allowing both the elevation and angle of a file or stone to be adjusted relative to the base edge surface when placed upon the shim. This apparatus is portable, inexpensive, easy to use and helps to minimize the fatigue and effort required to perform an accurate and consistent edge sharpening and beveling job, especially on ski and snowboard equipment with inherent base edge and side edge bevel angles as described above.

According to another aspect, dedicated for side wall and/or side edge use one or two bars are detachably mounted to a single wear plate in one of two selected positions (in the case where one bar is mounted to a wear plate), or four selected positions (in the case where two bars mounted to a wear plate) to slidingly engage and establish a selected angular orientation of the guide and a file in a plane transverse to the lengthwise direction when positioned at the side edge portion of the ski or snowboard, thereby establishing a desired side edge geometry or bevel angle.

According to another aspect, dedicated for side edge use an abrasive disc may be placed on the elongate surface of the bar at a predetermined central position where the circumference of the disc is aligned with file position indicators to insure the full diameter of the disc contacts the surface of the side edge of a ski or snowboard, thereby maximizing the edge cutting and polishing efficiency of disc. In this respect the disc may be easily and repeatedly properly positioned by the technician using the guide to perform an accurate and consistent edge sharpening and beveling job. File position indicators follow the circumference of the disc and are molded, laser etched or milled into the elongate surfaces of each bar.

According to another aspect, dedicated for base edge use a one-piece variant of the guide incorporating both wear plate and bar(s) includes indexing pad(s) and a shim fastened to the bar(s) in spaced proximity to the indexing pad(s) at one of multiple predetermined fixed positions allowing both the elevation and angle of a file or stone to be adjusted relative to the base edge surface when placed upon the shim, as more fully described hereafter.

BRIEF DESCRIPTION OF THE DRAWINGS

Embodiments of the disclosure will now be described, by way of example only, with reference to the accompanying drawings, in which:

FIG. 1 is a perspective view illustrating an apparatus of an embodiment for tuning representative ski edges;

FIG. 1A is another perspective view illustrating the apparatus of FIG. 1 with an abrasive disc of an embodiment;

FIG. 1B is perspective view illustrating another embodiment of the apparatus of FIG. 1 with an abrasive disc of an embodiment;

FIG. 2 is a top view of the apparatus of FIG. 1;

FIG. 3 is a bottom view of the apparatus of FIG. 1;

FIG. 12 is a top view of part of the apparatus of FIG. 1 showing a shim of an embodiment;

FIG. 12A is an end view of the shim of FIG. 12;

FIG. 12B is a side view of the shim of FIG. 12 showing internal structures in phantom;

FIG. 12C is a side view of the shim of FIG. 12;

FIG. 13 is a top view of an indexing pad of an embodiment showing internal structures in phantom of the apparatus of FIG. 1;

FIG. 13A is a cross-section view of the indexing pad along line A-A of FIG. 13;

FIG. 13B is a side view of the indexing pad of FIG. 13 showing internal structures in phantom;

FIG. 13C is a bottom view of the indexing pad of FIG. 13 showing internal structures in phantom;

FIG. 15 is a top view of the apparatus of FIG. 1 with a file resting on the top elongate surface of one bar of the apparatus positioned for tuning a side wall of representative ski;

FIG. 15A is a cross-section view of the apparatus of FIG. 15 along line A-A of FIG. 15 illustrating a file resting on the top elongate surface of one bar positioned for the trimming and/or beveling of a side wall of a ski or snowboard;

FIG. 16 is a top view of the apparatus of FIG. 1 with a file resting on the top elongate surface of one bar of the apparatus positioned for tuning a side edge of a representative ski;

FIG. 16A is a cross-section view of the apparatus of FIG. 16 along line A-A of FIG. 16 illustrating a file resting on the top elongate surface of one bar positioned for the sharpening and/or beveling of a side edge of the representative ski;

FIG. 17 is a top view of the apparatus FIG. 1A illustrating the abrasive disc placed on the top elongate surface of one bar and aligned with disc position indicator(s) positioned for tuning a side edge of a representative ski;

FIG. 17A is a cross-section view of the apparatus along line A-A of FIG. 17 illustrating the abrasive disc resting on the top elongate surface of one bar positioned for the sharpening and/or beveling of a side edge of the representative ski;

FIGS. 22, 23, and 24 are top views of an apparatus of an embodiment having one wear plate removed illustrating a file resting on the top surface of the shim and base edge of a representative ski with the shim fastened to bars in spaced proximity to the indexing pads for the sharpening and/or beveling of a base edge at approximately 0.5° (0.5 degree), 0.75°, and 1.0° respectively;

FIGS. 22A, 23A, and 24A are cross-section views of the apparatus of FIGS. 22, 23, and 24 along lines B-B of FIGS. 22, 23, and 24 positioned for the sharpening and/or beveling of a base edge of a representative ski at approximately 0.5°, 0.75°, and 1.0° respectively;

FIG. 25 is a perspective view an apparatus of an embodiment for base edge sharpening and beveling illustrating a one-piece frame that has an integrated wear plate and bars and includes indexing pads and a shim fastened to the frame in spaced proximity to the indexing pads at one of multiple predetermined fixed positions;

FIG. 25A is an end view of the apparatus of FIG. 25 illustrating a one-piece frame;

FIG. 25B is a top view of the apparatus of FIG. 25 illustrating the one-piece frame and the fastened shim;

FIG. 25C is a side view of the apparatus of FIG. 25 illustrating the one-piece frame and the fastened shim and indexing pads; and FIG. 25D is a bottom view of the apparatus of FIG. 25 illustrating the one-piece frame and the fastened indexing pads and shim in spaced proximity to the indexing pads at one of multiple predetermined fixed positions.

DETAILED DESCRIPTION OF EMBODIMENTS

Figure 4:
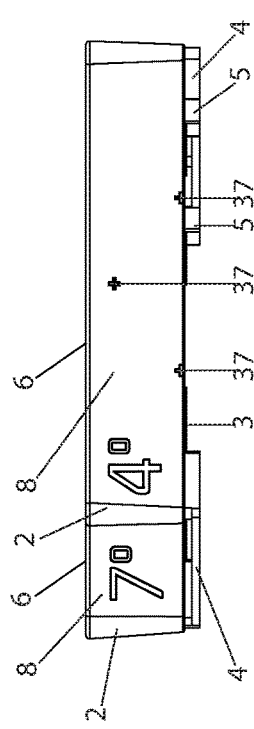
FIG. 4 is a side elevation view of the apparatus of FIG. 1.

The description which follows and the embodiments described therein are provided by way of illustration of examples of particular embodiments of the principles of the present disclosure. These examples are provided for the purposes of explanation and not limitation of those principles and of the disclosure. In the description which follows, like parts are marked throughout the specification and the drawings with the same respective reference numerals.

Aspects of embodiments are described with respect to a sharpening tool being used in situ when sharpening or beveling an edge of a ski. The sharpening tool is typically a handheld file. The edge of the ski being sharpened is an edge that comes in contact with a snow surface. Typically one or both of a base edge and a side edge require sharpening. The term "edge", when used herein for a ski or snowboard, will typically relate to an edge being sharpened, unless otherwise noted. Occasionally, the described edge may refer to an edge of a ski that is not being sharpened. However, the context of the term edge as used will be clear in view of the related text in the description. When an embodiment is described herein as being used to sharpen an edge of a ski, the ski can be an Alpine ski or Nordic ski, as suitably modified as needed. As well as sharpening an edge of a ski, an embodiment may be used to bevel an edge of a ski as well. The term "tuning" will be understood to describe sharpening and/or beveling an edge of a ski. As well, an embodiment may also be used to tune an edge of a snowboard. As such, it will be understood that for the purpose of this disclosure, the use of the term "ski", represents a ski, a snowboard or both, unless otherwise noted. All these terms and contexts will be understood by those of relevant skill in the art.

To provide context for orientation and directional terms used herein, the term "longitudinal" used herein describes the direction along the major length of a ski (e.g. from front to back of the ski) and accordingly, the term "longitudinal", when used herein in association with an embodiment describes a direction along the major length of the embodiment (e.g. from front to back of the embodiment when aligned with the front to back of a ski). Correspondingly, the term "transverse" used herein describes a direction across the major length of a ski (e.g. from left side to right side of the ski) and accordingly, the term "transverse", when used in association with an embodiment describes a direction across the major length of the embodiment (e.g. from the left side to the right side of the embodiment when the embodiment is aligned with the front to back of a ski). The terms "longitudinal" and "transverse" and other orientation terms will have inherent and clear directional meaning in view of their context and related text in the description.

Briefly, an aspect of embodiment provides an apparatus that may be used to support a sharpening tool being used to tune an edge of a ski. In one aspect an apparatus has one or more bars detachably mounted to a wear plate. A bar, as a sharpening tool support bar, is shaped to provide one or more surfaces on which the tool can be supported as the apparatus is held against the ski while the edge is being tuned. The bar may be located on the wear plate in one or more positions, to present one or more of its surfaces as an outer surface of the apparatus to support the tool while the apparatus is in use with the bottom surface of the wear plate being held against the base of the ski. Each surface may be angled from the bottom to the top of the bar to present an angled support base for the sharpening tool when the bar and wear plate are joined together. As such, an apparatus has a bar that is a sharpening tool support bar that has one or more tool support surfaces.

Another aspect provides an apparatus that may support a sharpening tool being used to bevel a base edge of a ski. The apparatus has two bars mounted to a wear plate and a shim in a spaced relationship. The space between the bars and above the wear plate and the shim is shaped and dimensioned to receive and guide a sharpening tool as the apparatus is held against the ski base. The dimensions, and potential positions, locations and orientations, of the shim within the space permit the sharpening tool to be oriented at a plurality of fixed positions relative to the ski base edge, to facilitate beveling of the ski base edge at one of a plurality of angles when the shim is fastened to the bars in spaced apart proximity to the ski base edge at one of multiple predetermined fixed positions.

Another aspect provides an apparatus that may support a sharpening tool facilitating both base edge and side edge bevel angles when sharpening (and polishing) a ski. The apparatus has a frame to which at least one bar and a set of attachments can be attached thereto in a geometric orientation forming an outline of part of a rectangle or parallelogram. The set of attachments include at least one wear plate, an indexing pad, and a shim. Each member of the set may be attached to the frame at one of a plurality of fixed positions. The matrix of combinations of fixed positions and/or orientations for all the attachments provides a plurality of elevation and angle positions for a sharpening tool to be positioned relative to the base edge when the sharpening tool is placed upon the top surface of shim (at its position) and the base edge. The bar also provides at least two tool support surfaces upon which a sharpening tool may be placed in order to bevel and sharpen a ski side edge at a plurality of angles when at least one wear plate is in sliding contact with the ski base.

Yet another aspect provides a polishing disc used in conjunction with the apparatus to bevel a side edge of a ski or snowboard to assist in easily identifying and positioning the polishing disc in the apparatus to facilitate a technician using the apparatus to perform an efficient, accurate, and consistent edge sharpening and beveling job.

Referring firstly to FIGS. 1, 1A and 1B, there are shown two embodiments of an apparatus for tuning a ski or snowboard side edge or base edge. For the sake of brevity, use of the term "ski" herein will be understood to include "ski or snowboard" and use of the term ski "edge" herein will be understood to include the ski's (or snowboard's) "side edge" and/or "base edge", unless otherwise noted. The apparatus comprises guide 1 adapted to be handheld and moved lengthwise along an edge portion of a ski while in contact with a surface thereof. Guide 1 comprises: two bars 2, one shim 3, two wear plates 4, and two indexing pads 5. Further details of a holder configuration for guide 1 and its construction will be described below. As shown in FIGS. 1, 1A, 2, 3, and 4 in an embodiment, guide 1 has two bars 2. As shown in FIG. 1B in an embodiment, guide 1 has one bar 2. Each bar 2 comprises an external top surface 6, an external bottom surface 7, two exterior elongated surfaces 8 and 9, multiple screw ports 10, each including screw head countersinks 11, screw holes 12, and at least one elongated cavity 13 located along the exterior bottom surface 7. As noted earlier, bar 2 is a sharpening tool support bar were elongated surfaces 8 and 9 provide tool support surfaces. Each elongated cavity 13 has a first wall 14, a bottom surface 15 and a second wall 16, where the cavity is defined between first and second walls 14, 16 and above bottom surface 15. In other embodiments, a cavity may be formed from a slot (where the first wall joins the second wall and there is no separate "bottom"), depression, bowl, channel or other inward feature in bar 2. An embodiment may provide a cavity that does not have edges providing distinctive walls, e.g. with a cavity having a cross-section profile of a half-cylinder. For such a cavity, respective first and second walls may be considered to be sections of the half cylinder that face each other, at least partially. For the purpose of convenience, and not limitation, where the term "cavity" is used herein, it will be understood that any inward features described herein may be provided in place of the described cavity unless otherwise noted. According to one embodiment, each bar 2 may be made from a rigid/sturdy thermoplastics material which may have reinforced with glass fibers. According to one embodiment, each bar 2 may be made from metal, wood, carbon fiber, or any other suitable materials or combination thereof that provides sufficient rigidity and strength, as needed.

Each elongated surface 8 and 9, provides a surface on which to support a sharpening tool for a ski while guide 1 is moved lengthwise along an edge of a ski. As shown, elongated surfaces 8 and 9, are positioned to be opposite each other, so that bar 2 may be selectively mounted to wear plates 4 in different orientations. In a first orientation, bar 2 is mounted to wear plates 4 in a first orientation to present elongate surface 8 as an outside surface for guide 1. In a second orientation it is mounted to present elongate surface 9 as an outside surface for guide 1. Elongated surfaces 8 and 9 may be parallel to each other, or may be tapered from the external top surface 6 to the external bottom surface 7. Such tapering of elongated surfaces 8 and 9 may be symmetrical or not about a longitudinal axis of bar 2. Per FIG. 1B, in use, a file (not shown) or abrasive disc 36 may be pressed against the exterior surface 8 and moved along the ski edge (in directions 100), thereby sharpening the edge at an angle determined by the exterior slope of the exterior surface 8.

In other embodiments for bar 2, one elongated surface is provided. In other embodiments for bar 2, elongated surfaces 8 and 9 are positioned to be adjacent to each other and/or opposite each other. In other embodiments for bar 2, one or more additional elongated surfaces are provided.

Figure 5:
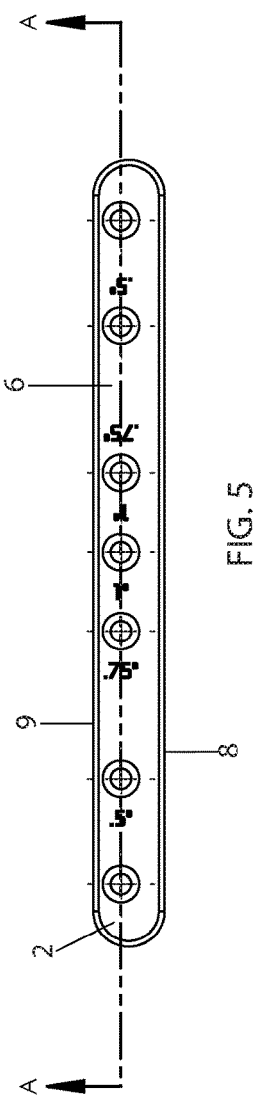
FIGS. 5 and 5A are top and end elevation views of variants (1° and 7° variants) of a bar of an apparatus of FIG. 1.
Figure 6:
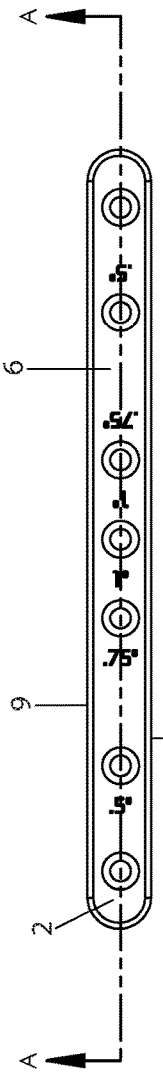
FIGS. 6 and 6A are top and end elevation views of variants (3° and 2° variants) of a bar of an apparatus of FIG. 1.
Figure 7:
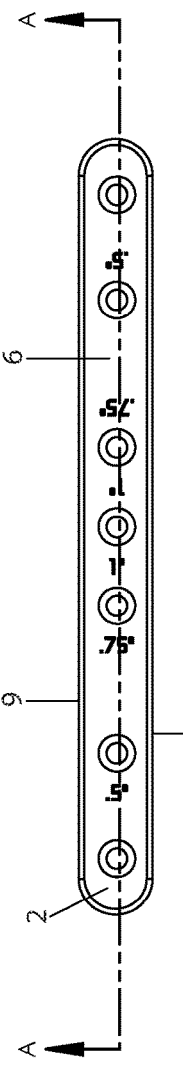
FIGS. 7 and 7A are top and end elevation views of variants (5° and 4° variants) of a bar of an apparatus of FIG. 1.
Figure 5A:
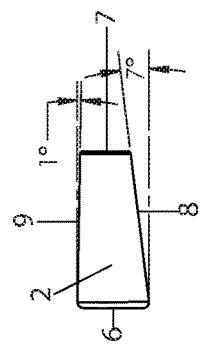
Figure 6A:
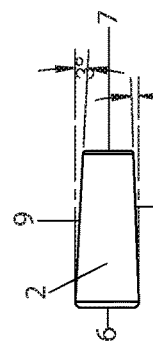
Figure 7A:
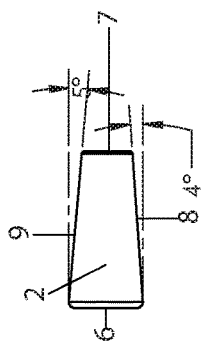
Figure 8:
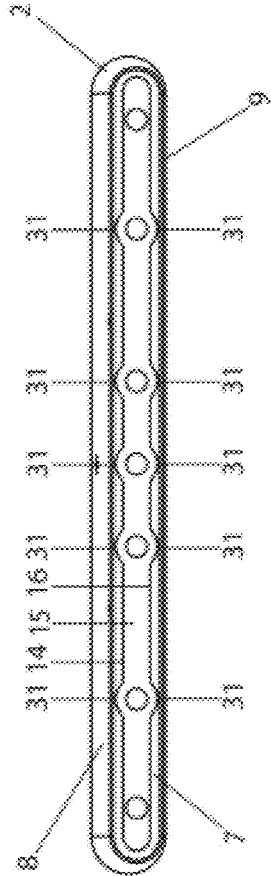
FIG. 8 is a bottom view of a bar of an apparatus of FIG. 1.
Figure 21:
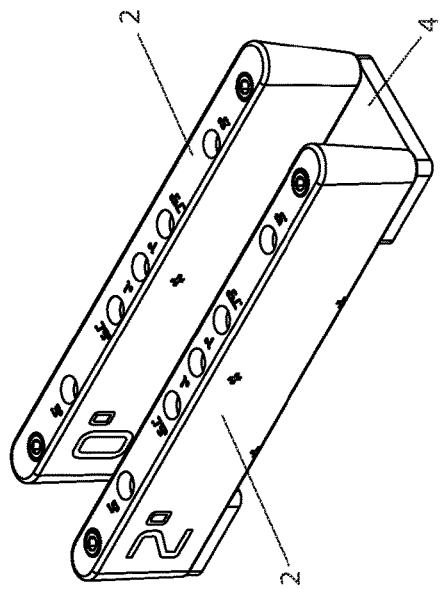
FIG. 21 is a perspective view of an apparatus of an embodiment for side edge/side wall sharpening and/or beveling having two bars fastened to a "H" shaped wear plate.
Figure 21A:
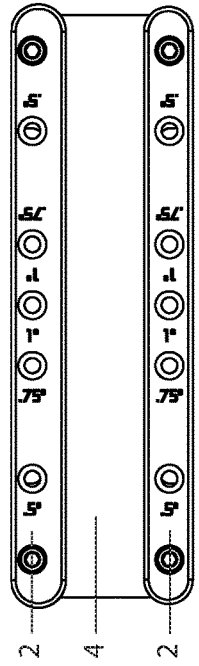
FIG. 21A is a top view of the apparatus of FIG. 21 illustrating the two bars fastened to the "H" shaped wear plate with cap screws.
Figure 21B:
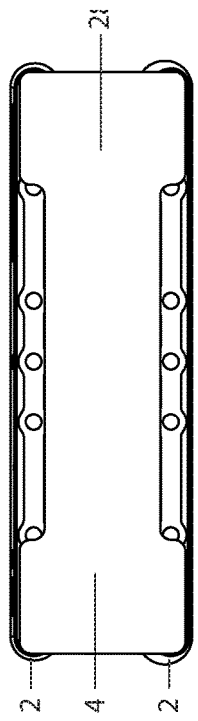
FIG. 21B is a bottom view of the apparatus of FIG. 21.
Figure 20:
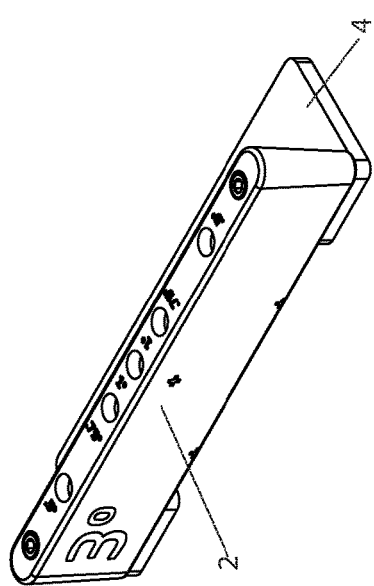
FIG. 20 is a perspective view of an apparatus of an embodiment for side edge/side wall sharpening and/or beveling having one bar fastened to a "U" shaped wear plate.

In embodiments where shapes and surfaces of elongated surfaces 8 and 9 are not parallel to each other and are not perpendicular to wear plates 4 (when mounted thereto), each surfaces' taper presents a base section for supporting the sharpening tool against an edge of the ski, at an angle produced by its taper and the orientation bar 2 about its wear plates 4. In embodiment where shapes and surfaces of elongated surfaces 8 and 9 are parallel and perpendicular to wear plates 4 (when mounted thereto) or where they have the same taper, each surfaces' taper will present a base for supporting the sharpening tool against the edge of the ski, at the same angle, providing two wear surfaces for bar 2 that have the same angle. For ease of identification, the amount of taper of surface 8 may be embossed, printed, or marked thereon (e.g. "7°", "4°", "3°", "2°", "0°", etc. as shown in FIGS. 1, 20 and 21). FIGS. 5 and 21A, each show one set of screw ports for bar 2 positioned closer to one elongated surface than the other, thereby providing one facility to provide a taper for bar 2.

As described above, for one embodiment, each elongated surface 8 and 9 is generally flat along its base section and its base section extends along the entire length (or most of the length) of that surface 8, 9. In other embodiments the base section may extend only part ways along the length of surface 8, 9 where one or more sections may extend (inwardly or outwardly) and/or be at a different taper to that base section from the plane of the base section along another part of surface 8, 9. Any of those one or more sections may also be shaped to support the sharpening tool as well.

As shown in FIGS. 1 and 2, for guide 1, two bars 2 are mounted to two wear plates 4, with bars 2 being offset from each other, thereby forming an outline of a parallelogram (per top view of FIG. 2). In one embodiment, the offset angle produced between bar 2 and wear plate 4 to vertical is approximately 40°. This offset angle provides an improved base edge cutting efficiency to account for the angle of when file 19 is used with guide 1 to tune an edge of a ski. In particular, when guide 1 has an offset angle to vertical between bar 2 and wear plate 4 of approximately 40°, when a typical bastard file (for file 19) is used in guide 1, its teeth are presented at an angle of approximately a 75° angle to vertical in a plane transverse to the length of the ski edge. In other embodiments, other offset angles may be provided, for example between 0° and approximately 75° (either positive or negative).

Figure 9:
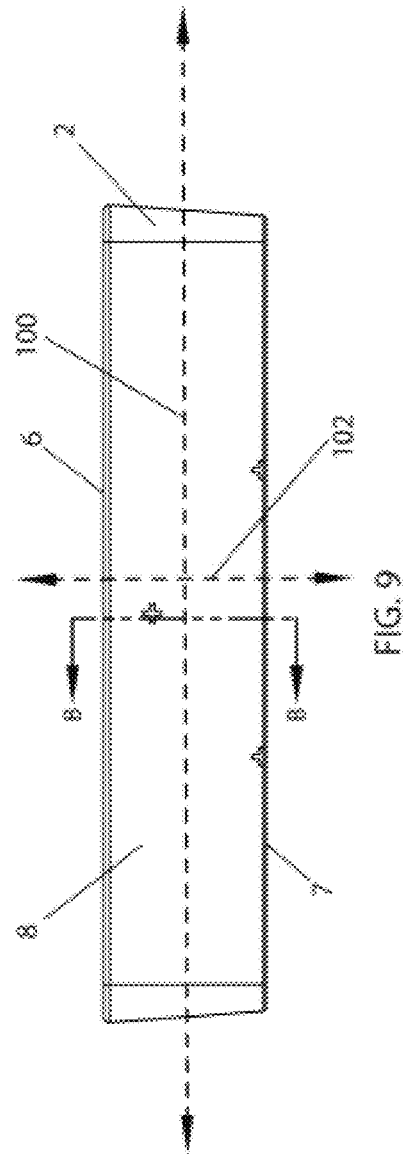
FIG. 9 is a side elevation view of a bar of an apparatus of FIG. 1.
Figure 10:
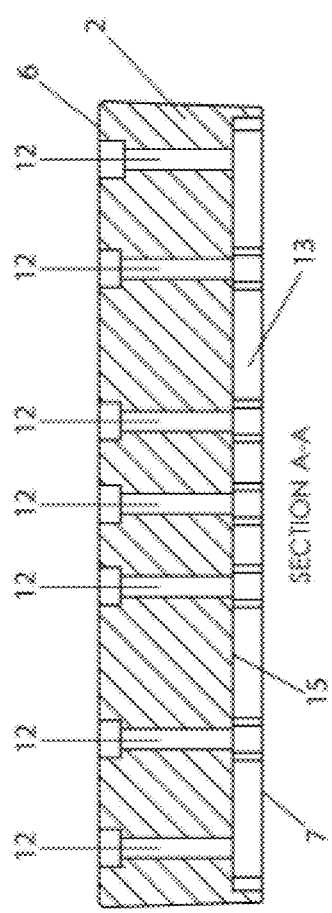
FIG. 10 is a cross-section view of a bar along line A-A of FIGS. 5, 6, and 7 respectively.

With reference to FIGS. 5, 5A, 6, 6A, 7, 7A and 9 the angle of each elongate surface 8, 9 of bar 2 may be the same or may vary, for example the angle of elongate surface 8 may be approximately 7° to facilitate trimming of ski side wall 17 (which may be made from a thermoplastics material) and the opposing elongate surface 9 may be approximately 1° to facilitate tuning ski side edge 18. Alternatively each elongate surface 8, 9, may be in parallel proximity to screw ports 10 and employ no angle at all, or be fraction of a whole number, a whole number, or a mixed number depending on the ski side edge angle preference of a technician using guide 1. Each bar 2 may be symmetric about its longitudinal axis (along line B-B of FIG. 9: FIG. 9 shows longitudinal axis 100 and central transverse axis 102). Alternatively, the first and second tool support surfaces of bar 2 may not be symmetric about its longitudinal axis (i.e. they are asymmetric). As an example, the first and second tool support surfaces of bar 2 may taper towards each other from its top surface to its bottom surface (tapering either symmetrically or not). Bar 2 may be detachably mounted to shim 3, wear plates 4, and indexing pads 5 to be readily detached from shim 3, wear plates 4, and indexing pads 5, rotated about central transverse axis 102 (here rotated approximately 180°) and then re-attached to wear plates 4, shim 3, and indexing pads 5 to change the top facing elongate surface 8 or 9 upon which file 19 may be placed thereby providing multiple selected angular orientations of guide 1 and file 19 or abrasive disc 36 in a plane transverse to the lengthwise direction when positioned at the side edge portion of the ski while in contact with the surface thereof. Further details of file 19 and abrasive disc 36 regarding their relative configurations and constructions are described below.

According to an embodiment, when shim 3, wear plate 4, and indexing pad 5 are mounted to bar 2, the edge portion of elongate surface 8, 9 at or around external bottom surface 7 is offset at an elevation sufficiently above shim vertical side surface 22, lower wear plate side surface 400, and lower indexing pad side surface 500 so as not to obstruct file 19 and abrasive disc 36 when placed on external top elongate surface 8 or 9, particularly if file 19 and abrasive disc 36 are oriented at an angle (produced by the taper of elongate surface 8 or 9) that is relatively acute, for example when the angle of elongate surface 8 is approximately 7° to facilitate trimming of ski side wall 17, which may be made from a thermoplastics material.

Figure 18:
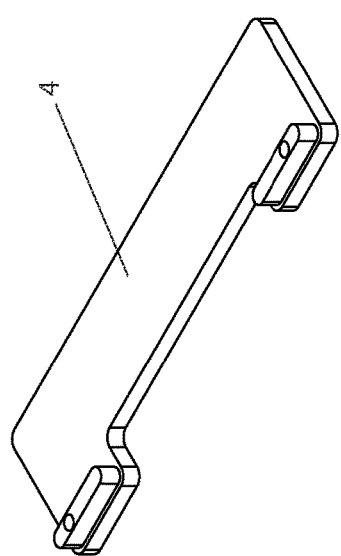
FIG. 18 is a perspective view of a "U" shaped wear plate of an apparatus of an embodiment for side edge/side wall sharpening and/or beveling.
Figure 18A:
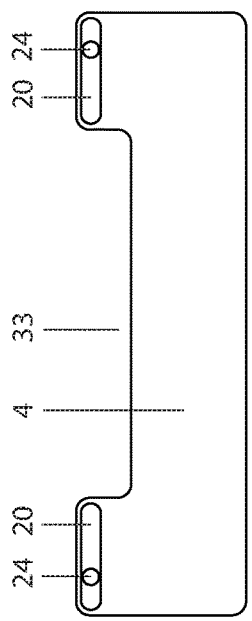
FIG. 18A is a top view of the "U" shaped wear plate of FIG. 18.
Figure 18B:
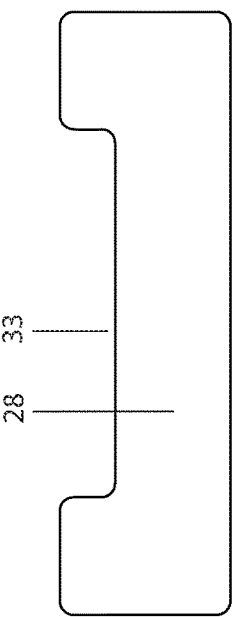
FIG. 18B is a bottom view of the "U" shaped wear plate of FIG. 18.
Figure 19:
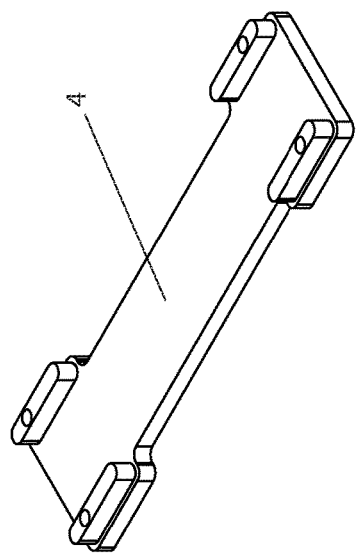
FIG. 19 is a perspective view of a "H" shaped wear plate of an apparatus of an embodiment for side edge/side wall sharpening and/or beveling.
Figure 19A:
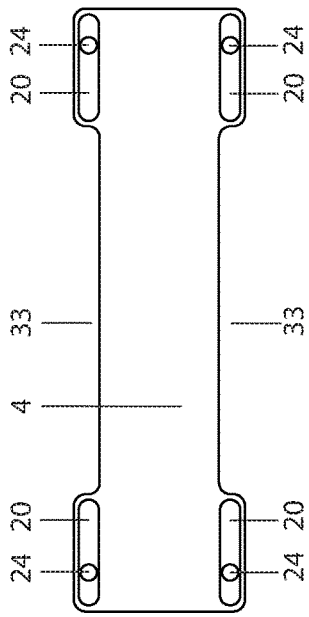
FIG. 19A is a top view of the "H" shaped wear plate of FIG. 19.
Figure 19B:
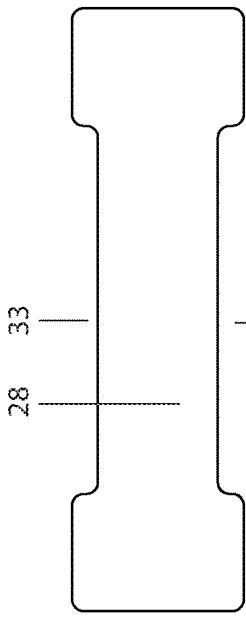
FIG. 19B is a bottom view of the "H" shaped wear plate of FIG. 19.

In an embodiment, as noted wear plates 4 and at least one bar 2 are detachably mounted to each other. In other embodiments, mounting and securing of wear plates 4 to bar 2 are provided via a screw, aperture and threaded receiving hole system. Other friction fit and securing arrangements, mounting components, and systems may be provided between bar 2 and other components (e.g. shim 3, wear plates 4, and indexing pads 5). For example, among bar 2 and the other components, any one or more of screws or tabs may be provided on one part (e.g. bar 2) that mate with corresponding holes on the other part(s) (e.g. shim 3, wear plates 4, and/or indexing pads 5). Other arrangements include magnetic couplings, dips, tongue and groove matings, quick-positioning cam handles, and other mechanical coupling systems and means that are known to a person of skill in the art. It will be seen that the location and orientation of mounting components for bar 2 to other components may be symmetrically located amongst bar 2 and the other components to facilitate a relatively quick attaching and de-attaching procedure while providing a sufficiently sturdy attachment and providing two or more alternative set orientations for bar 2 relative to the other components. As shown in FIGS. 18A and 19A and according to one embodiment, wear plate 4 includes a spaced apart-support tongues 20 that may be inserted into elongated cavity 13 along bottom surface 7 of bar 2 in order to conveniently orient and attach bar 2 to wear plate 4 in either of a first position where elongated surface 8 is presented as an exterior surface of the apparatus, or second position where elongated surface 9 is presented as an exterior surface of the apparatus when bar 2 is detached, rotated 180° about central transverse axis 102 (FIG. 9) to its longitudinal axis and re-attached to wear plate 4. Alternative embodiments may have one or more tool support bar(s) and one or more wear plate(s) formed as an integral unit upon which shims and indexing pads may be attached at specific locations.

In an embodiment, dimensions and shapes of bar 2 provide sufficient support profiles for file 19 as guide 1 is held and positioned along a ski. Representative dimensions bar 2 are approximately 5.25" long x approximately 1.07" wide with a thickness of between approximately 0.35" and 0.5". The representative thickness depends on angles between each elongated surface. As such, a representative range of dimensions for bar 2 are between approximately 3" and 6" in length, between approximately 0.75" and 1.25" in width and having a thickness of between approximately 0.25" and 0.75". It will be appreciated that these representative dimensions are non-limiting and that other dimensions and/or shapes for bar 2 may be provided in other embodiments that effect a comparable function and effect of bar 2.

In an embodiment, dimensions and shapes of wear plate(s) 4 provide sufficient support for bar 2, when it is mounted thereto as guide 1 and is held and positioned along a ski. Representative dimensions for wear plate 4 may vary depending on which wear plate is being used. Single wear plates (shown in FIGS. 18, 18A, 18B, 19, 19A, and 19B) have representative dimensions of approximately 5.16"× 1.45"×0.17" (excluding dimensions of support tongues). Small wear plate (shown in FIGS. 11, 11A, 11B, and 11C) have representative dimensions of approximately 1.65"× 0.55"×0.1" (again, excluding dimensions of support tongues). As such, a representative range of dimensions of wear plates (excluding support tongues) is between approximately 0.5" and 6" long, between approximately 1" and 1.75" wide and between approximately 0.1" and 0.25" thick. It will be appreciated that these representative dimensions are non-limiting and that other dimensions and/or shapes for wear plates of an embodiment may be provided in other embodiments that effect a comparable function and effect of such wear plates.

In an embodiment, dimensions and shapes of shim 3 provide sufficient support for file 19 to rest upon when it is mounted to at least one bar 2 as guide 1 is moved lengthwise along the base edge portion of a ski while in contact with a surface thereof. Dimensions and shapes of shim 3 are provided to permit both an elevation and an angle of file 19 to be set at one of a plurality of positions relative to base edge 45 of a ski when file 19 is placed upon the top surface 47 of shim 3 and base edge 45. Further details of shim 3 regarding its relative configuration and construction are described below. Representative dimensions for a shim (shown in FIGS. 12, 12A 12B, and 12C) may have comparable dimensions as a small wear plate except with a thinner thickness. For example, one representative thickness for a shim may be thinner than a wear plate by approximately 0.075", providing a thickness for the shim of between approximately 0.02" and 0.03". It will be appreciated that these representative dimensions are non-limiting and that other dimensions and/or shapes for shims of an embodiment may be provided in other embodiments that effect a comparable function and effect of such shims.

Figure 11A:
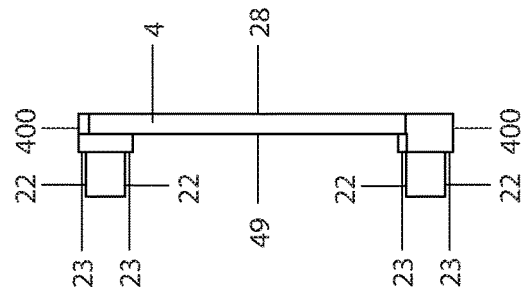
FIG. 11A is an end view of the wear plate of FIG. 11.
Figure 11C:
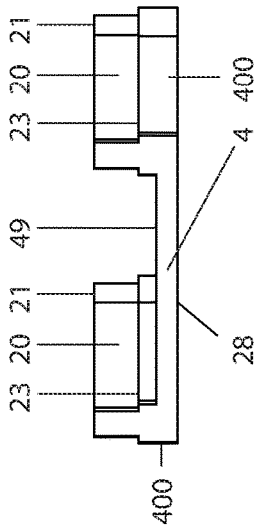
FIG. 11C is a side view of the wear plate of FIG. 11.
Figure 11:
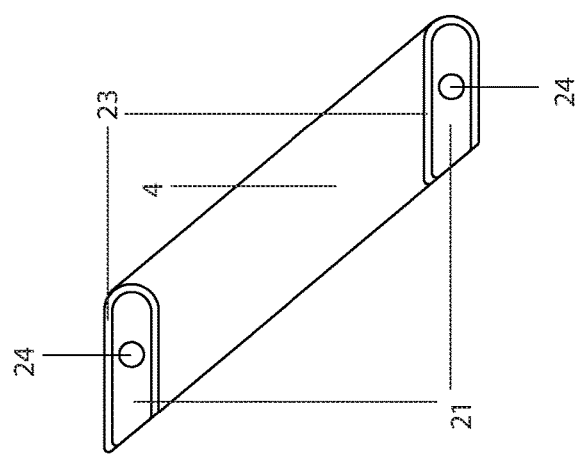
FIG. 11 is a top view of part of the apparatus of FIG. 1 showing a wear plate of an embodiment.
Figure 11B:
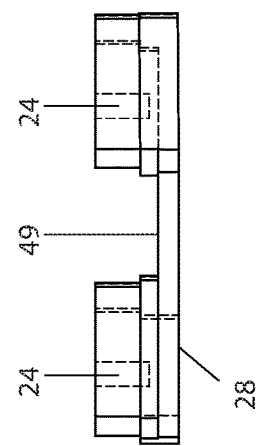
FIG. 11B is a side view of the wear plate of FIG. 11 showing internal structures in phantom.

As shown in FIG. 13, according to one embodiment, approximately the upper half or so of indexing pad 5 has a wide but relatively thin support tongue 20 integrally formed as part of indexing pad 5. As shown in FIGS. 11 and 12 and according to one embodiment, wear plate 4 and shim 3 include a spaced apart generally parallel pair of wide but relatively thin support tongues 20 integrally formed as a part of wear plate 4 and shim 3 respectively. Each support tongue 20 includes top surface 21, generally vertical side surfaces 22, base top surface 23 and aperture 24 perpendicular to top surface 21 provided to facilitate mounting shim 3, wear plate 4, and indexing pad 5 to bar 2 in a generally vertical orientation. According to one embodiment, indexing pad 5 may be made from a sturdy thermoplastics material such as Delrin or Teflon (trademarks) that allows indexing pad 5 to slide along an edge portion of a ski which may or may not be reinforced with glass fibers to provide the necessary strength and rigidity. According to one embodiment aperture 24 may include threads tapped or molded directly in a thermoplastics material, or alternatively threaded metal insert 25 may be inserted into a mold cavity around which a thermoplastics material is molded when indexing pad 5 is produced to provide aperture 24. According to one embodiment wear plate 4 and shim 3 may be made from metal, other suitable materials, etc. to provide the necessary strength, rigidity, and wear resistance when shim 3 and/or wear plate 4 is placed in sliding contact against a ski base. According to one embodiment, shim 3, wear plate 4, and indexing pad 5 may be coupled with bar 2 by pressing support tongues 20 into elongated cavity 13 of bar 2 by friction fit, or any other suitable mechanical coupling means, etc. According to one embodiment, shim 3, wear plate 4, and indexing pad 5 may be fastened to bar 2 by means of socket head cap screws 26 placed in screw ports 10 and turned into threaded apertures 24 of shim 3, wear plate 4, and indexing pad 5 respectively. According to one embodiment apertures 24 in shim 3, wear plate 4, and indexing pad 5 are blind holes to prevent a threaded portion of socket head cap screws 26 from protruding from bottom surface 27 of shim 3, bottom surface 28 of wear plate 4, and base contact surface 29 of indexing pad 5 and scratching the ski base 30 when guide 1 is placed in sliding contact thereof. According to one embodiment screw ports 10 are perpendicular to external bottom surface 7 and cavity bottom surface 15 of bar 2 and top surface 21 and base top surface 23 of the support tongue 20 permitting the surfaces to mate with each other in parallel alignment when fastened together. More specifically and according to one embodiment an approximately 90° orientation of shim 3, wear plate 4, and indexing pad 5 relative to screw ports 10 may be established when base top surface 23 of support tongue 20 is in parallel alignment and in contact with the external bottom surface 7 of bar 2. According to another embodiment an approximately 90° orientation of shim 3, wear plate 4, and indexing pad 5 may be established when top surface 21 of support tongue 20 is in parallel alignment and in contact with the cavity bottom surface 15 of the bar 2. It will be appreciated that one or more surfaces of shim 3, wear plate 4, indexing pad 5 may be in contact with one or more surfaces of the bar 2 at the same time to establish an approximately 90° orientation for shim 3, wear plate 4, indexing pad 5 to bar 2, and that in other embodiments shim 3, wear plate 4, and indexing pad 5 may be fastened to bar 2 in alignments and orientations other than 90° according to a preference of the technician using guide 1. It will be appreciated that in other embodiments, bar 2, shim 3, wear plate 4, and indexing pad 5 may be mated together with various clamping, friction fit, mechanical coupling, threading and/or other locking or engagement systems known to those of skill in the art.

According to one embodiment, indents 31 may be integrally formed along first wall 14, bottom surface 15 and/or second wall 16 of elongated cavity 13 that mate with complementary protuberances 32 formed in a generally vertical side surfaces 22 and/or top surface 21 of shim 3, wear plate 4, and indexing pad 5 support tongues 20 shaped to complement the shape of indents 31 permitting convenient and accurate placement of shim 3, wear plate 4, and indexing pad 5 the shim 3, wear plate 4 in predetermined and fixed positions along the length of bar 2. It will be appreciated that other mechanical arrangements including a wide variety of shape variants of indents 31 and complementary protuberances 32 including for instance round, square, hex, star, etc., may be employed to orient shim 3, wear plate 4, and indexing pad 5 in any one of a plurality of positions along bar 2.

As shown in FIGS. 20 and 21, and according to another aspect of the disclosure dedicated for side wall 17 and/or side edge 18 use, one or two bar(s) 2 are detachably mounted to a single wear plate 4 in one of two selected positions (in the case where one bar 2 is mounted to wear plate 4), or four selected positions (in the case where two bars 2 are mounted to wear plate 4) to slidingly engage and establish a selected angular orientation of guide 1 and file 19 or abrasive disc 36 in a plane transverse to a lengthwise direction when positioned at the side edge portion of the ski, thereby establishing a desired side edge geometry and/or bevel angle. As best shown in FIGS. 18, 18A, 18B, and 20 and according to one embodiment, bottom surface 28 of wear plate 4 has a "U" shaped profile providing an open area 33 in approximately its upper middle section into which edge filings may fall to attempt to prevent the filings from falling and becoming lodged between and scratching wear plate bottom surface 28 and ski base 30 when guide 1 is moved lengthwise along the side wall and/or side edge portion of a ski while in contact with a surface thereof. As best shown in FIGS. 19, 19A, 19B, and 21 and according to another embodiment, wear plate 4 has an "H" shaped profile providing open area 33 in approximately its upper and lower middle sections into which edge filings and debris may fall when file 19 or abrasive disc 36 is placed on one elongate surface 8, 9 of either bar 2 and guide 1 is moved lengthwise along the side wall and/or side edge portion of a ski while in contact with a surface thereof. It will be appreciated in addition to "U" and "H" shapes the bottom surface 28 of wear plate 4 may take the form of other convenient shapes that provide a stable contact surface when in sliding contact with a ski base 30 and have at least one open area 33 into which edge filings and debris may fall, or have no open area 33 at all, for example, when bottom surface 28 is either a square or rectangular shape. As best shown in FIGS. 15, 16, and 17 and according to one embodiment a horizontal offset between base top surface 23 of wear plate 4 and indexing pad 5 and bottom surface 28 of wear plate 4 and bottom surface 34 of indexing pad 5 provides a convenient aperture 35 through which edge filings and debris may fall between bars 2 and the ski base 30 when guide 1 is moved lengthwise along the side edge portion of a ski while in contact with a surface thereof. It will be appreciated in addition to facilitating mounting of shim 3, wear plate 4, and indexing pad 5 to bar 2, elongated cavity 13 also provides an area into which edge filings and debris may be collected when guide 1 is moved lengthwise along the side edge portion of a ski while in contact with a surface thereof to attempt to prevent the filings and debris from falling and becoming lodged between and scratching wear plate bottom surface 28 and ski base 30. Further details of the holder configuration and construction are described below.

Figure 20A:
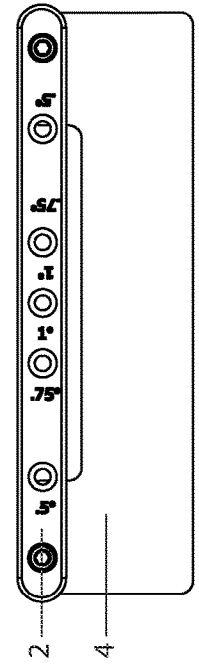
FIG. 20A is a top view of the apparatus of FIG. 20 illustrating the bar fastened to the "U" shaped wear plate with cap screws.
Figure 20B:
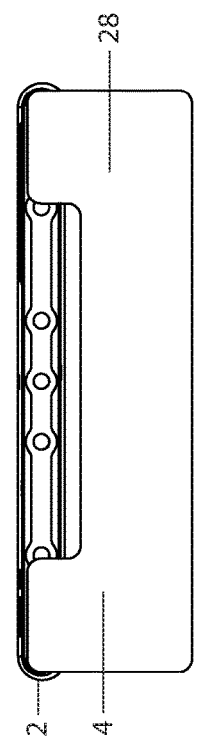
FIG. 20B is a bottom view of the apparatus of FIG. 20.

As shown in FIGS. 20 and 21, bar(s) 2 is mounted to wear plate(s) 4, in an orientation forming an outline of part of a rectangle (per top views of FIGS. 20A and 21A). In other embodiments, other orientations may be provided to have an offset angle, for example between 50 and approximately 75° (either positive or negative). As best shown in FIG. 2, in an embodiment where guide 1 is able to tune both a base edge 45 and a side wall 17 and/or side edge 18 of a ski, bars 2 are mounted to wear plates 4 in an orientation forming an outline of part of a parallelogram. A typical offset may be approximately 40° to vertical produced between bar 2 and wear plate 4.

It will be appreciated that the term "file" as used in this disclosure is a generic term for a (handheld) sharpening tool that files and as known by a person of skill in the art encompasses a variety of cutting/polishing tools for file 19, such as rough (panzer) files, smooth (mill) files, extra-coarse, coarse, fine, and extra fine diamond whetstones, deburring stones, diamond abrasives, etc. typically of various rectangular shapes and sizes able to be placed upon and held by a hand or clamped to guide 1 at any one of a plurality of desired angular positions in a plane transverse to the lengthwise direction when positioned at the side edge portion of the ski according to preference of the technician using guide 1. Thus, a desired portion of the file length may make contact with ski side edge 18 and/or the teeth on file 19 may be oriented at any desired angle relative to the lengthwise direction of movement. This assists the technician using guide 1 in producing a consistent file cut and efficient edge sharpening or beveling job regardless of the amount of shaping or side cut of the ski.

For another embodiment, FIGS. 14, 14A, 14B, and 14C illustrate abrasive disc 36 that may be placed on elongate surface 8, 9 of bar 2 at a predetermined central position where the circumference of disc 36 is aligned with file position indicators 37 to facilitate attempting to maximize having as much as possible of diameter "d" of disc 36 contacting the surface of ski side edge 18 thereby assisting in maximizing edge cutting and polishing efficiency of disc 36. As such, position indicator(s) 37 provide alignment indicator(s) relative to a shape of disc 36, and indicate a contact area for the first abrasive surface on an edge of the ski. Disc 36 may have a second abrasive surface on its opposite side.

More specifically and according to one embodiment two file position indicators 37 along the bottom edge of each elongate surface 8, 9 of bar 2 may be spaced apart at a distance slightly less than the diameter of abrasive disc 36 (when it is circular) and a third file position indicator 37 may be centered about the longitudinal axis of elongate surfaces 8, 9 and spaced apart from the bottom edge of each elongate surface at a distance slightly less than half the diameter of disc 36 to assist in accounting for an offset created by the thickness of wear plate 4 and a typical ski side edge 18 width of approximately 2 mm. In this respect disc 36 may be easily and repeatedly properly positioned on an elongate surface 8, 9 of bar 2 by aligning its placement on bar 2 to be within indicators 37 by a technician using guide 1 to perform an efficient, accurate, and consistent edge sharpening and beveling job, while avoiding adjusting of an angular orientation of a rectangular shaped file 19 to maximize edge cutting and polishing efficiency, especially convenient if the technician using guide 1 is a beginner having little edge sharpening and beveling experience. In other embodiments, where disc 36 has a non-circular shape, the location of and positioning of indicator 37 may be placed in comparable locations relative to the major axis of that disc. Disc position indicators 37 follow the circumference of disc 36 and may be molded, embossed, printed, laser etched or milled into elongate surfaces 8, 9 of each bar 2. It will be appreciated file position indicators 37 may take the form of any visible symbols (where one embodiment employs three "+" symbols in spaced proximity as shown in FIG. 5), or may take the form of other alignment marks including other symbols, curved line(s) etc. Comparable indicator(s) may also be provided on disc 36 to assist in aligning its edge to indicators 37.

Figure 14:
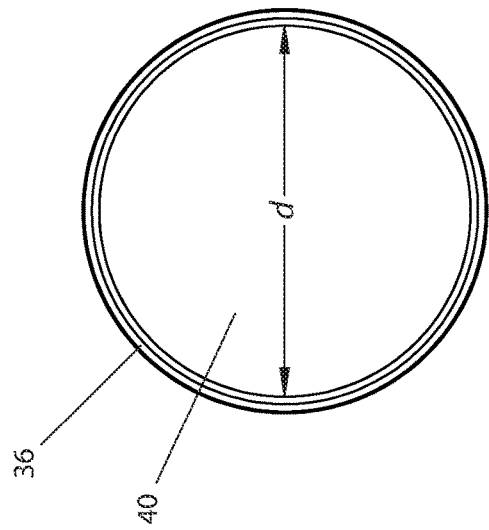
FIG. 14 is a perspective view of the abrasive disc of FIG. 1A.
Figure 14A:
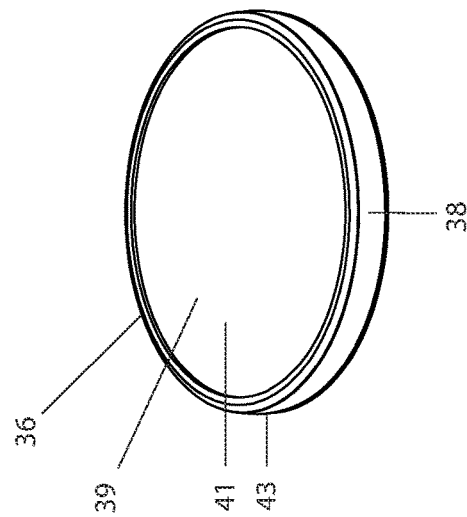
FIG. 14A is a top view of the abrasive disc of FIG. 1A.
Figure 14B:
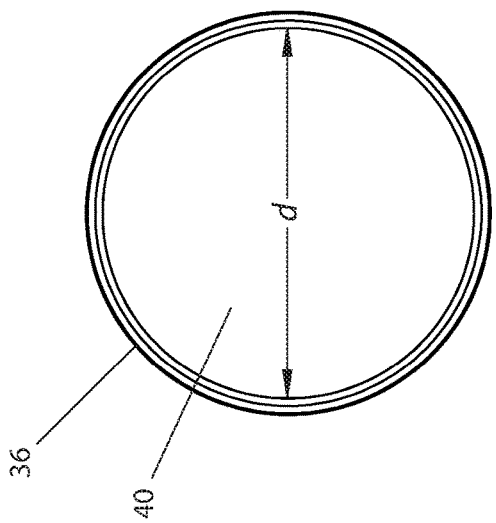
FIG. 14B is a bottom view of the abrasive disc of FIG. 1A.
Figure 14C:
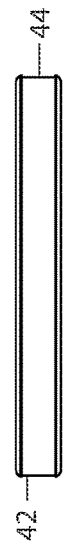
FIG. 14C is a side elevation view of the abrasive disc of FIG. 1A.

As shown in FIGS. 14A and 14B, according to one embodiment there is shown abrasive disc 36 with a circumference corresponding to, and that may be aligned with disc position indicators 37 when placed on each elongate surface 8, 9 of bar 2. According to one embodiment abrasive disc 36 is circular in shape, although it may be round, orbicular, elliptical, square, triangular, or any other polygonal shape. In an embodiment, abrasive disc 36 is comprised of backer 38, backer indent 39, and abrasive sheet 40 of varying grits on one or both sides of backer 38. One or both of abrasive disc 36 and/or backer 38 may have a circular cross-section. Backer 38 may be cylindrical in shape. Abrasive sheet 40 may be an abrasive diamond sheet, or a comparable abrasive sheet as known to a person of skill in the art. In one embodiment, abrasive sheet 40 may be circular in shape. According to one embodiment, backer 38 may be dimensioned suitably to support abrasive sheet 40 and may made from a sufficiently sturdy thermoplastics material which may be reinforced with glass fibers to provide additional strength and rigidity. According to another embodiment backer 38 may be made from metal, wood, carbon fiber and/or other suitable materials. Abrasive sheet 40 has a thickness greater than the depth of indent 39 and may be applied and adhered to one or both indent surfaces 41 using an adhesive, or perhaps double-sided pressure sensitive tape, each diamond sheet 40 having an outside diameter slightly less than the diameter of indent 39. It will be appreciated that indent 39 provides an alignment and centering feature when applying and adhering diamond sheet 40 to indent surfaces 41, protects the edge of diamond sheet 40 from damage when in contact with the surface of ski side edge 18, and provides a mechanical support to reduce unwanted slipping of sheet 40 across indent surface 41, especially when disc 36 is positioned and pressed down upon the side edge portion of the ski and is in sliding contact with the surface thereof. According to one embodiment, backer 38 further comprises label indent 42 in vertical side surface 43 where a label may be provided identifying the grit and/or diameter of each diamond sheet 40. It will be appreciated label indent 42 provides an alignment and centering feature when applying and adhering a label to indent surface 44, protects the label from damage, and provides mechanical support to reduce unwanted slipping of label across indent surface 44 when in use. It will be appreciated means other than a label for identifying the grit and/or diameter of each diamond sheet 40 of disc 36 may be used including, but not limited to, for example, identifying marks, numbers or other symbols molded, laser etched or milled into vertical side surface 43. Further details of the apparatus configuration and construction are described below.

In an embodiment, representative dimensions for abrasive disc 36, when it is circular, provide a diameter of approximately 47 mm for backer 38, a diameter of approximately 45 mm for abrasive sheet 40, and a thickness of approximately 4.1 mm for backer 38. As such, a representative range of dimensions abrasive disc 36 has a diameter of between approximately 25.4 mm and 50.8 mm (namely, approximately between 1" and 2") and with a thickness between approximately 1.9 mm and 6.35 mm (namely, between approximately 0.075" and 0.25"). It will be appreciated that these representative dimensions are non-limiting and that that other dimensions and/or shapes for disc 36 may be provided in other embodiments that effect a comparable function and effect of such discs.

Figures 23, 23A:
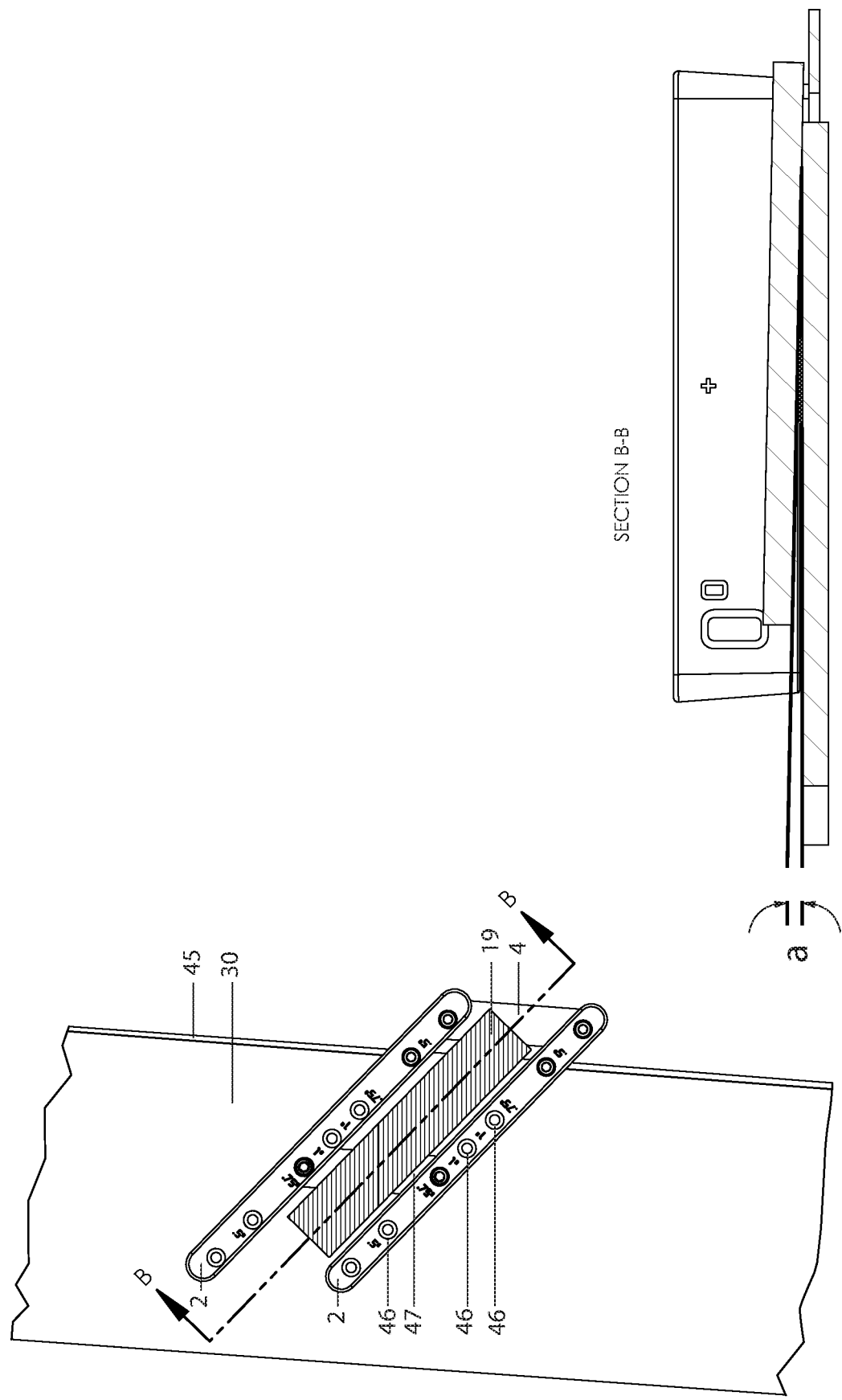

With reference now to FIGS. 22, 22A, 23, 23A, 24, and 24A, according to one embodiment, a ski base edge 45 may be beveled at one of a plurality of angles when one wear plate 4 and two indexing pads 5 are attached to two bars 2 and shim 3 is fastened to bars 2 in spaced apart proximity to indexing pads 5 at one of multiple predetermined fixed positions 46. These angles enable both the elevation and angle of file 19 to be adjusted relative to base edge 45 of a ski when file 19 is placed upon the top surface 47 of shim 3 and base edge 45. Indexing pad 5 includes base contact surface 29 that positions guide 1 relative to the surface of ski base 30 and includes side edge contact surface 48 that positions guide 1 relative to ski side edge 18 when in sliding contact with surfaces thereof. File 19 may be placed upon both top surface 47 of shim 3 and base edge 45 to bevel and sharpen base edge 45 when in sliding contact with the surface thereof. It will be appreciated that when guide 1 is placed upon ski base 30, top surface 49 of wear plate 4 remains at an elevation under the base edge 45 so as to likely be in a position to not interfere with base edge beveling and sharpening ability of file 19. As illustrated in FIGS. 22A, 23A, and 24A, the base bevel angle shown as "a" depends on the thickness of shim 3 and the distance between the base edge 45 and shim 3. Assuming the thickness of shim 3 does not change the base bevel angle "a" is readily changed simply by repositioning shim 3 at one of multiple predetermined fixed positions 46 along the length of bars 2. It will be appreciated the closer shim 3 is positioned to side edge contact surface 48 of indexing pad 5, the larger the base bevel angle "a" becomes.

According to one embodiment, shim 3, wear plate 4, and indexing pads 5 are positioned in parallel proximity to a ski edge and bars 2 are positioned at approximately a 40° angle in a plane transverse to the lengthwise direction when guide 1 is positioned on the base edge portion of the ski while in contact with the surface thereof. As teeth of a typical mill bastard file are angled at approximately 35° in a plane transverse to the length of the file 19, this configuration attempts to maximize file cutting efficiency by consistently positioning the file teeth at approximately a 75° angle in a plane transverse to the length of the ski edge.

With reference to FIGS. 25, 25A, 25B, 25C, and 25D, according to another embodiment bars 2 and one wear plate 4 may be combined as a single integral unit upon which shim 3 and indexing pads 5 are fastened. Other combinations may be provided in lieu of, or in addition to the combination of two bars 2, one shim 3, one wear plate 4 and two indexing pads 5. For example, single shim 3 and indexing pad 5 may be fastened to one bar 2 to facilitate tuning ski base edge 45.

It will be appreciated that features describing aspects of embodiments as being "verticar, "parallel", "aligned" or in other terms relating to position or orientation have a range of acceptable values or positions that, if provided, still provide a functional embodiment. For example, a component described as having "vertical" or "parallel" element(s) will encompass elements that are substantially vertical or parallel. As a further example, if two components are described as being "parallel" in orientation, other embodiments will tolerate the two components being aligned in a nearly parallel fashion (where the description may use the term "generally parallel"). Similarly, if a component is described as being "aligned", other embodiments will tolerate a component being nearly aligned. It will be plainly obvious to a person of skill in the art as to what range of values would be acceptable.

In this disclosure, where a threshold or dimension is provided as an approximate value (for example, when a dimension or threshold is qualified with the term "approximately"), a range of values will be understood to be valid for that value. For example, for a dimension stated as an approximate value, a range of about 25% larger and 25% smaller than the stated value may be used. Thresholds, values, measurements, and dimensions of features are illustrative of embodiments and are not limiting unless noted. Further, a "sufficient" designation (e.g. a sufficient size) may mean having dimensions or values that provide a minimum amount of material or size to achieve a stated function of the related parameter.

In this disclosure, where the conjunction "and/or" is used to end a list of elements, it will be understood that its use indicates an "inclusive or" of the listed elements. As such, the phrase "X and/or Y" means "(X or Y) or (both X and Y)".

Although this disclosure describes embodiments where the apparatus are used to assist sharpening an edge of a ski or snowboard, it will be appreciated that other embodiments may be provided for sharpening edges of other sports equipment or devices where a sharpening tool requires support against a plane of such devices.

Although the disclosure has been described with reference to certain specific embodiments, various modifications thereof will be apparent to those skilled in the art without departing from the scope of the disclosure as outlined in the claims appended hereto.

What is claimed is:

1. An apparatus for supporting a sharpening tool when tuning an edge of a ski or snowboard, the apparatus comprising:
   a first tool support bar having
      a top surface,
      a bottom surface,
      a first tool support surface connecting the top surface to the bottom surface, the first tool support surface providing a first surface oriented at a first guide angle to the bottom surface, and
      a second tool support surface connecting the top surface to the bottom surface in a spaced relationship to the first tool support surface, the second tool support surface providing a second surface at a second guide angle to the bottom surface; and
   a wear plate detachably matable to the bottom surface of the first tool support bar, wherein the first tool support bar is matable to the wear plate in
   a first position, where the first tool support surface supports the sharpening tool at the first guide angle while the apparatus is in use with the wear plate being held against a base of the ski or snowboard; and
   a second position, where the bar is rotated approximately 180° about a central transverse axis of the first tool support bar, where the second tool support supports the sharpening tool at the second guide angle while the apparatus is in use with the wear plate being held against the base.

2. The apparatus as claimed in claim 1, wherein the first and second tool support surfaces are asymmetric to each other about a longitudinal axis of the first tool support bar.

3. The apparatus as claimed in claim 1, wherein one of the first and second tool support surfaces tapers towards the opposing tool support surface of the first tool support bar in a spaced relationship.

4. The apparatus as claimed in claim 1, wherein the first and second tool support surfaces taper towards each other from the top surface to the bottom surface about a longitudinal axis of the first tool support bar.

5. The apparatus as claimed in claim 1, wherein the wear plate further comprises:
   an open area to collect filings from the ski or snowboard created when tuning the edge of the ski or snowboard.

6. The apparatus as claimed in claim 2, wherein the first tool bar further comprises:
   a screw port to receive a screw to mate the first tool bar to the wear plate, the screw port located closer to the first tool support surface than the second tool support surface.

7. The apparatus as claimed in claim 1, further comprising:
   a second tool support bar having
      a second tool top surface,
      a second tool bottom surface,
      a second tool first support surface connecting the second tool top surface to the second tool bottom surface, the second tool support surface providing a third surface at a third guide angle to the bottom surface.

8. The apparatus as claimed in claim 7, wherein:
   the second tool bar further comprises a fourth tool support surface connecting the top surface to the bottom surface in a space relationship to the third tool support surface, the fourth tool support surface providing a fourth surface providing a fourth guide angle to the bottom surface; and
   the second tool support bar is matable to the wear plate in
      a third position, where the third tool support surface supports the sharpening tool at the third guide angle while the apparatus is in use with the wear plate being held against the base; and
      a fourth position, where the bar is rotated approximately 180° about a central transverse axis of the third tool support bar, where the fourth tool support supports the sharpening tool at the fourth guide angle while the apparatus is in use with the wear plate being held against the base.

9. The apparatus as claimed in claim 8, wherein one of the third and fourth tool support surfaces tapers towards its opposing tool support surface of the second tool support bar in a spaced relationship.

10. The apparatus as claimed in claim 7, wherein each of the first and second tool support bars may be rotated about a central transverse axis to its longitudinal axis.

11. The apparatus as claimed in claim 7, wherein the first bar is mountable to the wear plate at an orientation orienting the sharpening tool at the first or second guide angle edge when the apparatus is positioned at a side edge portion of the ski or snowboard.

12. The apparatus as claimed in claim 7, further comprising:
   a shim attachable to at least one of the first and second tool support bars in one of a plurality of positions; and
   an indexing pad attachable to at least one of the first and second tool support bars, wherein
   the edge is a base edge of the ski or snowboard; and
   the positions of the shim and the indexing pad relative to their attached tool support bar orient the sharpening tool at a plurality of set elevations and angles relative to the base edge when the sharpening tool is placed upon a top surface of shim and base edge.

13. The apparatus as claimed in claim 12, wherein:
   the shim, wear plate and indexing pad are positioned in parallel proximity to the edge of the ski or snowboard edge; and
   the first and second tool support bars are positioned at approximately a 40° angle in a plane transverse to the lengthwise direction when the apparatus is positioned and moved lengthwise along a base edge portion of the ski or snowboard while in contact with the surface thereof.

14. The apparatus as claimed in claim 7, wherein at least one of the first and second tool support bars further comprises one or more cavities for receiving the wear plate, the shim, and the indexing pad.

15. The apparatus as claimed in claim 7, wherein at least one of the first and second tool support bars further comprises an area to collect filings from the ski or snowboard created when tuning the edge of the ski or snowboard.

16. The apparatus according to claim 15, wherein a horizontal offset is created among the base top and bottom surfaces of the wear plate and indexing pad providing an aperture through which edge filings and debris may fall between first and second tool support bars and top and bottom surfaces of the wear plate.

17. The apparatus according to claim 7, wherein the wear plate further comprises a support tongue to facilitate mounting of the wear plate to tool support bar.

18. The apparatus as claimed in claim 7, further comprising:
a second wear plate detachably matable to the bottom surfaces of the first and second tool support bars.

19. The apparatus as claimed in claim 1, further comprising:
a position indicator on the first tool support, the position indicator providing an alignment indicator for a shape of the abrasive disc marking a contact area for the first abrasive surface on an edge of the ski or snowboard.

20. The apparatus as claimed in claim 19, wherein:
the position indicator indicates that approximately half of the abrasive disc will contact the contact area.

21. The apparatus as claimed in claim 1, wherein:
the first edge angle is 2 degrees; and
the second edge angle is 3 degrees.

22. The apparatus as claimed in claim 11, wherein:
the first edge angle is 7 degrees for sharpening the side edge portion.

* * * * *